US011940741B2

(12) United States Patent
Tonosu et al.

(10) Patent No.: US 11,940,741 B2
(45) Date of Patent: Mar. 26, 2024

(54) IMAGE FORMING APPARATUS AND EXPOSURE DEVICE

(71) Applicant: FUJIFILM Business Innovation Corp., Tokyo (JP)

(72) Inventors: Kenta Tonosu, Kanagawa (JP); Yosuke Kasuya, Kanagawa (JP); Takahiko Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/560,290

(22) Filed: Dec. 23, 2021

(65) Prior Publication Data

US 2023/0069539 A1 Mar. 2, 2023

(30) Foreign Application Priority Data

Aug. 25, 2021 (JP) ................................ 2021-137617

(51) Int. Cl.
*G03G 15/04* (2006.01)
*G03G 15/043* (2006.01)

(52) U.S. Cl.
CPC .......... *G03G 15/04* (2013.01); *G03G 15/043* (2013.01)

(58) Field of Classification Search
CPC ............ G03G 15/04; G03G 15/04036; G03G 15/04045; G03G 15/04054; G03G 15/04063
See application file for complete search history.

(56) References Cited

U.S. PATENT DOCUMENTS 9,712,712 B1 * 7/2017 Kuo .................... G03G 15/326
10,877,431 B1 * 12/2020 Kodo ................ G03G 21/1666
2002/0149664 A1 * 10/2002 Nagamine ............. B41J 25/308 347/257
2004/0008333 A1 * 1/2004 Oda ...................... G03G 15/50 355/55
2005/0134677 A1 * 6/2005 Kawasaki ........... G03G 15/326 347/238
2006/0146120 A1 * 7/2006 Joichi ............. G03G 15/04054 347/238
2007/0126852 A1 * 6/2007 Fukutome ........ G03G 15/04054 347/262
2011/0299883 A1 * 12/2011 Suzuki .............. G03G 21/1853 399/110
2016/0109823 A1 * 4/2016 Judd ................... G03G 15/043 347/118
2018/0173132 A1 * 6/2018 Tsukada .......... G03G 15/04054
(Continued)

FOREIGN PATENT DOCUMENTS

JP 2005022259 1/2005

*Primary Examiner* — Carla J Therrien
(74) *Attorney, Agent, or Firm* — JCIPRNET

(57) ABSTRACT

An image forming apparatus includes: an image carrier that extends in a first direction; a light emitter that includes a substrate that extends in the first direction, and multiple light-emitting devices that are disposed on the substrate and emit light to the image carrier; a positioning portion that is disposed between the substrate and the image carrier, and that fixes a position of the light emitter with respect to the image carrier in at least one direction perpendicular to a light emission direction; and an adjuster that is located to overlap the positioning portion when viewed in the first direction, and that adjusts a position of the light emitter in the light emission direction.

19 Claims, 17 Drawing Sheets

(56) References Cited

U.S. PATENT DOCUMENTS

| | | | | |
|---|---|---|---|---|
| 2018/0364611 | A1* | 12/2018 | Gokyu | G03G 21/1666 |
| 2019/0212289 | A1* | 7/2019 | Kushida | G01N 33/346 |
| 2021/0278778 | A1* | 9/2021 | Ando | G03G 21/1666 |

* cited by examiner

IMAGE FORMING APPARATUS AND EXPOSURE DEVICE

CROSS-REFERENCE TO RELATED APPLICATIONS

This application is based on and claims priority under 35 USC 119 from Japanese Patent Application No. 2021-137617 filed Aug. 25, 2021.

BACKGROUND

(i) Technical Field

The present disclosure relates to an image forming apparatus and an exposure device.

(ii) Related Art

Japanese Unexamined Patent Application Publication No. 2005-22259 discloses a focusing device of an optical write device that matches, with the surface of an image carrier, the focal point of light emitted from multiple light-emitting devices arranged in parallel in correspondence with pixels in the main scanning direction of the image forming area. The focusing device includes a storage member that stores a pattern image, an image forming member that forms an electrostatic latent image pattern corresponding to the pattern image stored in the storage member onto the surface of an image carrier, a surface-potential measuring member that measures the surface potential of the electrostatic latent image pattern area on the surface of the image carrier formed by the image forming member, and a position-changing mechanism that changes the position of an optical write device with respect to the surface of the image carrier to match the focal point of light from the light-emitting devices with the surface of the image carrier based on the surface potential measured by the surface-potential measuring member.

SUMMARY

Aspects of non-limiting embodiments of the present disclosure relate to an image forming apparatus and an exposure device having a smaller size in a direction perpendicular to a direction in which an image carrier extends, compared to a structure where a positioning portion and an adjuster are spaced apart when viewed in a direction in which the image carrier extends.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: an image carrier that extends in a first direction; a light emitter that includes a substrate that extends in the first direction, and multiple light-emitting devices that are disposed on the substrate and emit light to the image carrier; a positioning portion that is disposed between the substrate and the image carrier, and that fixes a position of the light emitter with respect to the image carrier in at least one direction perpendicular to a light emission direction; and an adjuster that is located to overlap the positioning portion when viewed in the first direction, and that adjusts a position of the light emitter in the light emission direction.

BRIEF DESCRIPTION OF THE DRAWINGS

Exemplary embodiments of the present disclosure will be described in detail based on the following figures, wherein.

DETAILED DESCRIPTION

An exemplary embodiment of the present disclosure (hereinafter referred to as an exemplary embodiment) will be described.

First Exemplary Embodiment

Image Forming Apparatus 10

Figure 1:
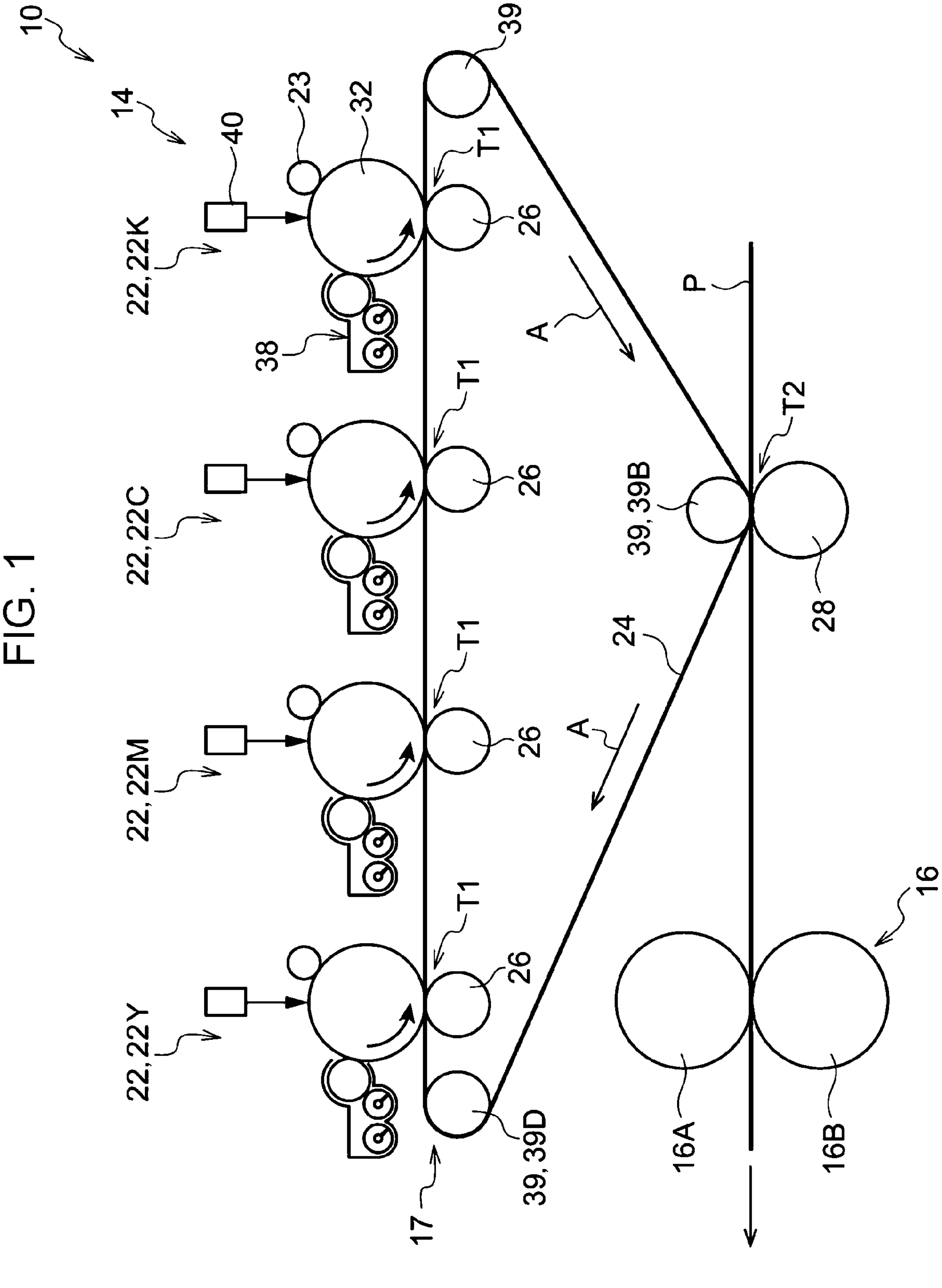
FIG. 1 is a schematic diagram of an image forming apparatus including an exposure device according to a first exemplary embodiment.

FIG. 1 is a schematic diagram of a structure of an image forming apparatus 10 including an exposure device 40 according to a first exemplary embodiment. The structure of the image forming apparatus 10 will be described first. Then, the exposure device 40 included in the image forming apparatus 10 will be described. The image forming apparatus 10 is, for example, an image forming apparatus forming images with multiple colors. An example of the image forming apparatus 10 is a full-color printer for commercial printing for which a particularly high image quality is desired.

The image forming apparatus 10 is a wide-image forming apparatus capable of handling media with a width exceeding the width of a recording medium P for B3 longitudinal feed (that is, the width exceeding 364 mm). For example, the image forming apparatus 10 handles recording media P of the size larger than or equal to 420 mm for A2 longitudinal feed and smaller than or equal to 1456 mm for B0 cross feed. For example, the image forming apparatus 10 handles recording media P of 728 mm for B2 cross feed.

The image forming apparatus 10 illustrated in FIG. 1 is an example of an image forming apparatus that forms images on recording media. More specifically, the image forming apparatus 10 is an electrophotographic image forming apparatus that forms toner images (an example of images) on the recording media P. Toner is an example of powder. More specifically, the image forming apparatus 10 includes an image forming unit 14 and a fixing device 16. Portions in the image forming apparatus 10 (the image forming unit 14 and the fixing device 16) will be described below.

Image Forming Unit 14

The image forming unit 14 has a function of forming toner images on the recording media P. More specifically, the image forming unit 14 includes toner image forming units 22 and a transfer device 17.

Toner Image Forming Units 22

The image forming unit 14 includes multiple toner image forming units 22 illustrated in FIG. 1 to form toner images of different colors. In the present exemplary embodiment, the image forming unit 14 includes the toner image forming units 22 for four colors of yellow (Y), magenta (M), cyan (C), and black (K). The letters Y, M, C, and K following the reference signs in FIG. 1 denote the colors to which the components correspond.

The toner image forming units 22 for the different colors have the same structure except for using different toner. Thus, in FIG. 1, components of the toner image forming unit 22K are denoted with reference sings as a representative of all the toner image forming units 22 for different colors.

More specifically, the toner image forming unit 22 for each color includes a photoconductor drum 32 that rotates in a first direction (for example, counterclockwise direction in FIG. 1). The photoconductor drum 32 is an example of an image carrier. The toner image forming unit 22 for each color also includes a charging device 23, the exposure device 40, and a developing device 38.

In the toner image forming unit 22 for each color, the charging device 23 electrically charges the photoconductor drum 32. The exposure device 40 exposes the photoconductor drum 32 electrically charged by the charging device 23 with light to form an electrostatic latent image on the photoconductor drum 32. The developing device 38 develops the electrostatic latent image formed on the photoconductor drum 32 by the exposure device 40 to form a toner image.

The photoconductor drum 32 rotates while carrying the electrostatic latent image formed in the above manner on the outer periphery to transport the electrostatic latent image to the developing device 38. A specific structure of the exposure device 40 will be described later.

Transfer Device 17

The transfer device 17 illustrated in FIG. 1 is a device that transfers toner images formed by the toner image forming units 22 onto the recording media P. More specifically, the transfer device 17 first-transfers the toner images on the photoconductor drums 32 for different colors to a transfer belt 24 serving as an intermediate transfer body in a superposed manner, and second-transfers the superposed toner images to a recording medium P. More specifically, as illustrated in FIG. 1, the transfer device 17 includes the transfer belt 24, first transfer rollers 26, and a second transfer roller 28.

Each first transfer roller 26 is a roller that transfers the toner image on the photoconductor drum 32 for the corresponding color to the transfer belt 24 at a first transfer position T1 between the photoconductor drum 32 and the first transfer roller 26. In the present exemplary embodiment, an application of a first-transfer electric field between the first transfer roller 26 and the photoconductor drum 32 transfers the toner image formed on the photoconductor drum 32 to the transfer belt 24 at the first transfer position T1.

The transfer belt 24 receives the toner image from each photoconductor drum 32 for the corresponding color on the outer peripheral surface. More specifically, the transfer belt 24 has the following structure. As illustrated in FIG. 1, the transfer belt 24 has an annular shape, and is wound around multiple rollers 39 to have its position fixed.

The transfer belt 24 rotates in the direction of arrows A with, for example, a driving roller 39D of multiple rollers 39 being driven to rotate by a driving unit (not illustrated). Among the multiple rollers 39, a roller 39B illustrated in FIG. 1 is an opposing roller 39B opposing the second transfer roller 28.

The second transfer roller 28 is a roller that transfers the toner image transferred to the transfer belt 24 to the recording medium P at a second transfer position T2 between the opposing roller 39B and the second transfer roller 28. In the present exemplary embodiment, an application of a second-transfer electric field between the opposing roller 39B and the second transfer roller 28 transfers the toner image transferred to the transfer belt 24 to the recording medium P at the second transfer position T2.

Fixing Device 16

The fixing device 16 illustrated in FIG. 1 is a device that fixes the toner image transferred to the recording medium P by the second transfer roller 28 to the recording medium P. More specifically, as illustrated in FIG. 1, the fixing device 16 includes a heating roller 16A serving as a heating member and a pressing roller 16B serving as a pressing member. The fixing device 16 heats and presses the recording medium P with the heating roller 16A and the pressing roller 16B to fix the toner image formed on the recording medium P to the recording medium P.

Exposure Device 40

Figure 2:
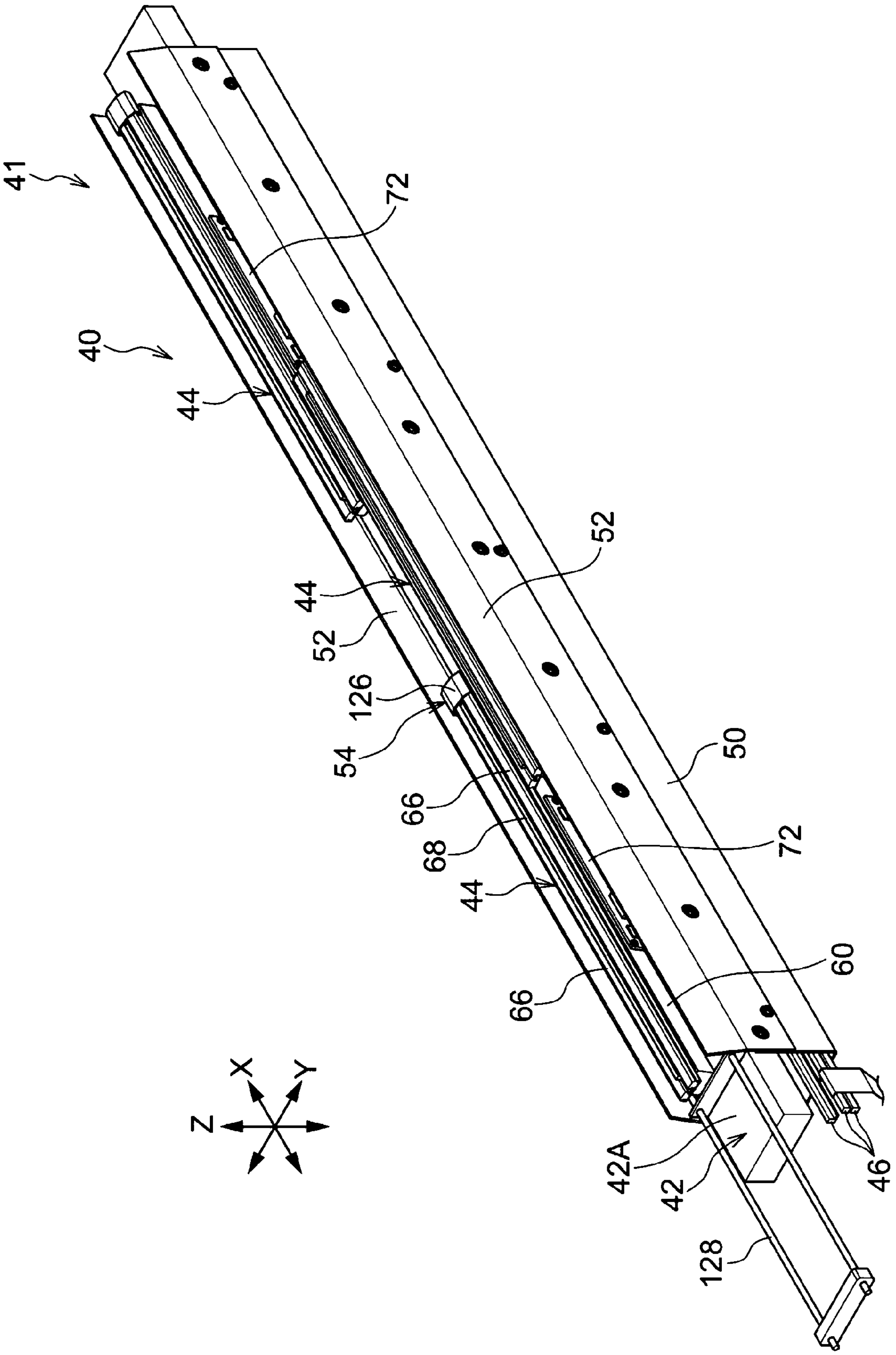
FIG. 2 is a perspective view of an exposure device included in the image forming apparatus.
Figure 3:
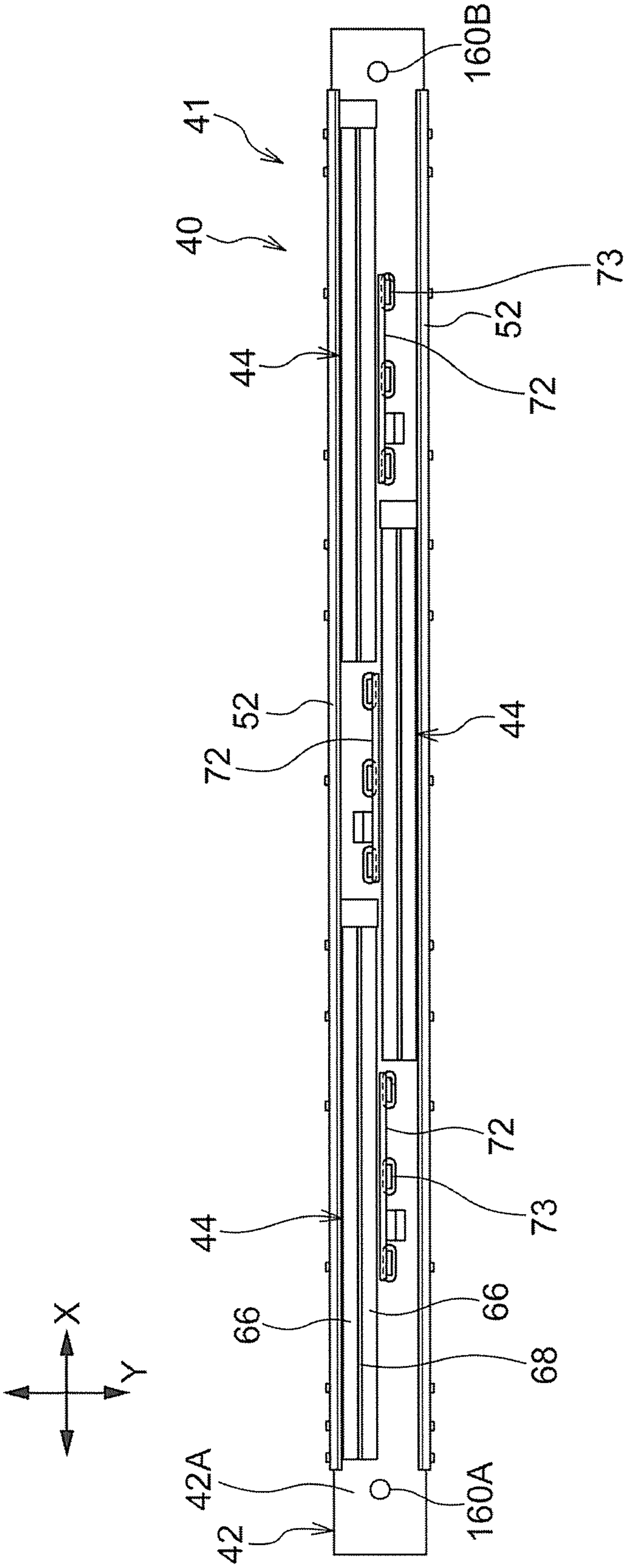
FIG. 3 is a diagram of a structure of the exposure device viewed in a vertical direction.

Subsequently, the structure of the exposure device 40 according to exemplary embodiments will be described. FIG. 2 is a perspective view of the structure of the exposure device 40. FIG. 3 is a plan view of the exposure device 40 viewed in the vertical direction. In the following description, the direction of arrow Y in the drawings indicates the width direction of the exposure device 40, and the direction of arrow Z indicates the height direction of the exposure device 40. The direction of arrow X perpendicular to the apparatus width direction and the apparatus height direction indicates the depth direction of the exposure device 40. The width direction and the height direction are merely defined for illustration convenience, and not used to limit the structure of the exposure device 40.

The entire structure of the exposure device 40 will be described first, and then components of the exposure device 40 will be described.

Figure 10:
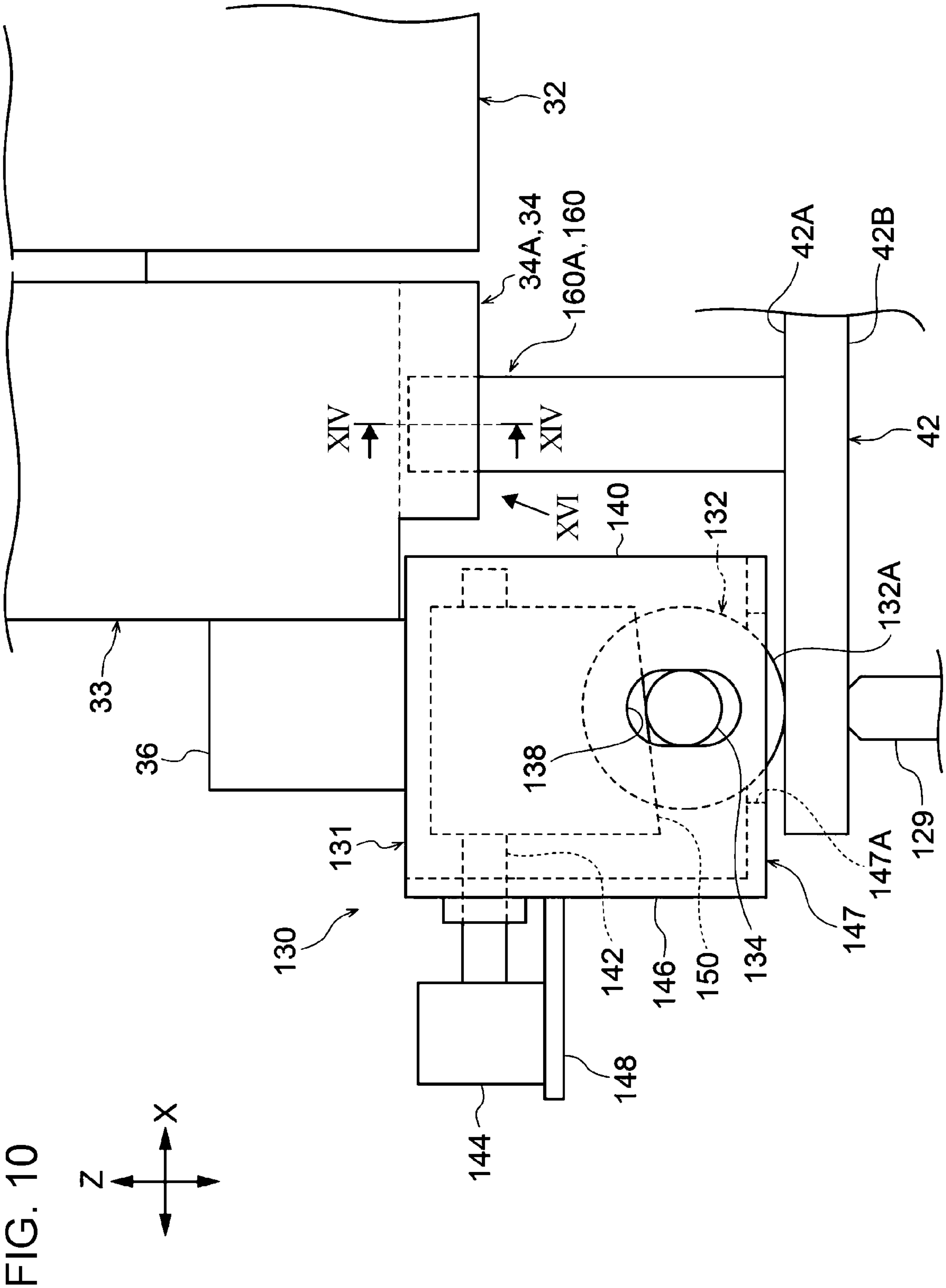
FIG. 10 is a side view of a positioning portion and an adjuster on a first side of the exposure device in an apparatus depth direction.

The exposure device 40 includes a light emitter 41, positioning portions 160, and position adjusters 130 as illustrated in FIG. 10.

Light Emitter 41

As illustrated in FIGS. 2 and 3, the light emitter 41 includes a substrate 42 extending in a first direction (a direction of arrow X in the present exemplary embodiment) and multiple light radiators 44 disposed on one side of the substrate 42 in the direction of arrow Z (upper side in the vertical direction in FIGS. 2 and 3). In the present exemplary embodiment, the light emitter 41 includes three light radiators 44 extending in a first direction of the substrate 42. The substrate 42 is a long rectangular member in a plan view in FIG. 3. The light radiators 44 have the same structure, and are long rectangular members in a plan view in FIG. 3.

For example, the three light radiators 44 are misaligned in the first direction of the substrate 42, that is, in a direction in which the substrate 42 extends (direction of arrow X), and misaligned in the width direction of the substrate 42 perpendicular to the first direction, that is, misaligned in the cross direction (direction of arrow Y) of the substrate 42. The light emitter 41 is disposed in the axial direction of the photoconductor drum 32 (refer to FIG. 1). The length of the light emitter 41 in the first direction is longer than the length of the photoconductor drum 32 in the axial direction. At least one of the three light radiators 44 faces the surface (outer peripheral surface) of the photoconductor drum 32. Thus, light emitted from the light emitter 41 is applied to the surface of the photoconductor drum 32.

In FIGS. 2 and 3 and other drawings, the light emitter 41 is illustrated with a side of the substrate 42 where the light radiators 44 are disposed on the upper side in the vertical direction, and light is emitted upward from the light radiators 44. On the other hand, in the image forming apparatus 10 in FIG. 1, the exposure device 40 is illustrated upside down in the vertical direction. Specifically, in FIG. 1, the exposure device 40 is disposed while having a side of the substrate 42 where the light radiators 44 are disposed on the lower side in the vertical direction, and light is emitted downward toward the photoconductor drum 32 from the light radiators 44.

In the present exemplary embodiment, the three light radiators 44 are staggered when viewed from above in the vertical direction of the exposure device 40 (refer to FIG. 3). More specifically, two light radiators 44 are disposed at both end portions of the substrate 42 in the first direction and at a first side of the substrate 42 in the cross direction. One light radiator 44 is disposed at the middle of the substrate 42 in the first direction and at a second side of the substrate 42 in the cross direction. End portions of the two light radiators 44 disposed at the first side of the substrate 42 in the cross direction and end portions of the light radiator 44 disposed at the second side of the substrate 42 in the cross direction overlap each other when viewed in the cross direction of the substrate 42. Specifically, the irradiation areas that are irradiated with light from the three light radiators 44 overlap each other in the first direction of the substrate 42.

Figure 4:
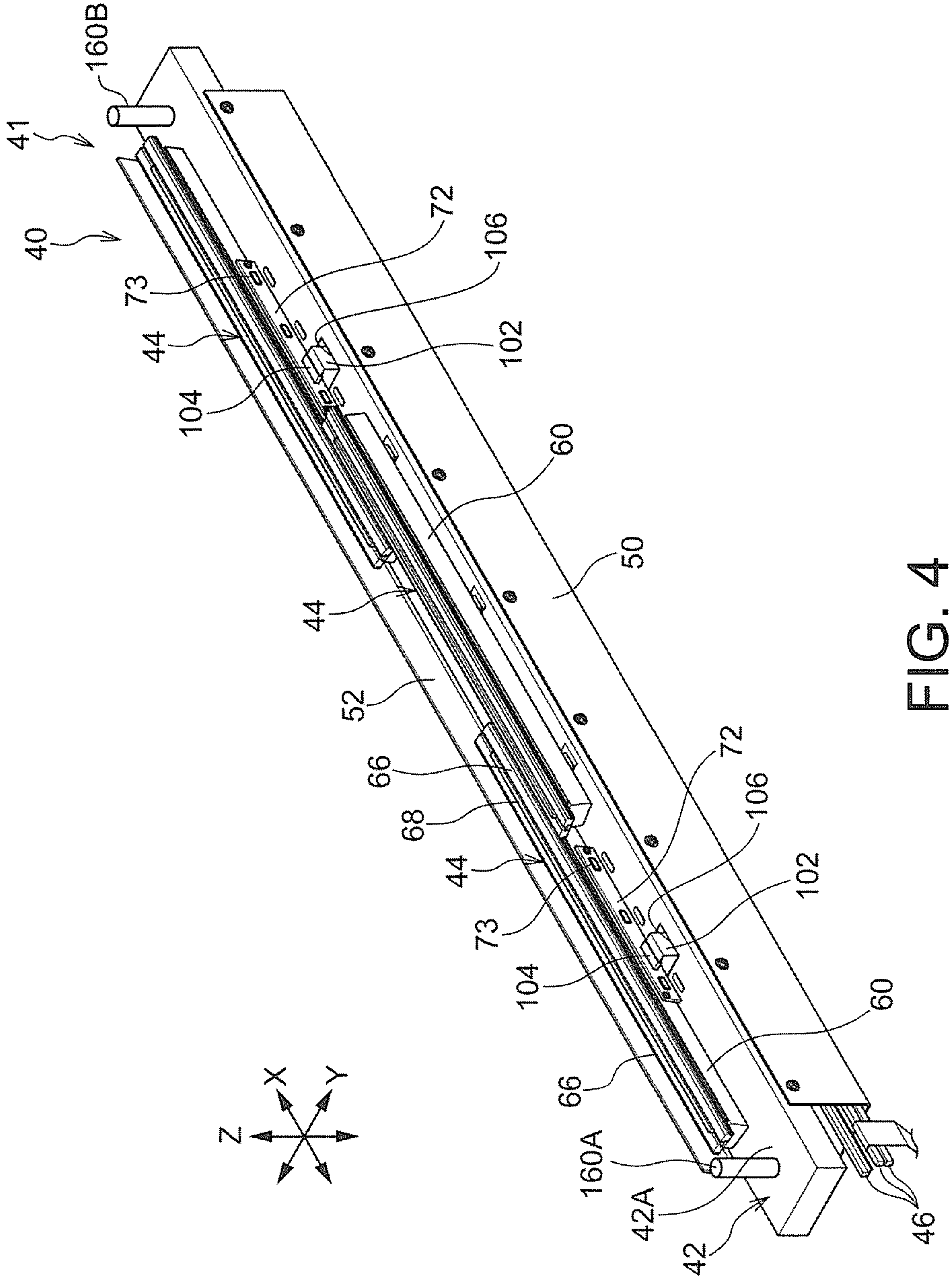
FIG. 4 is a perspective view of multiple light radiators in the exposure device.
Figure 5:
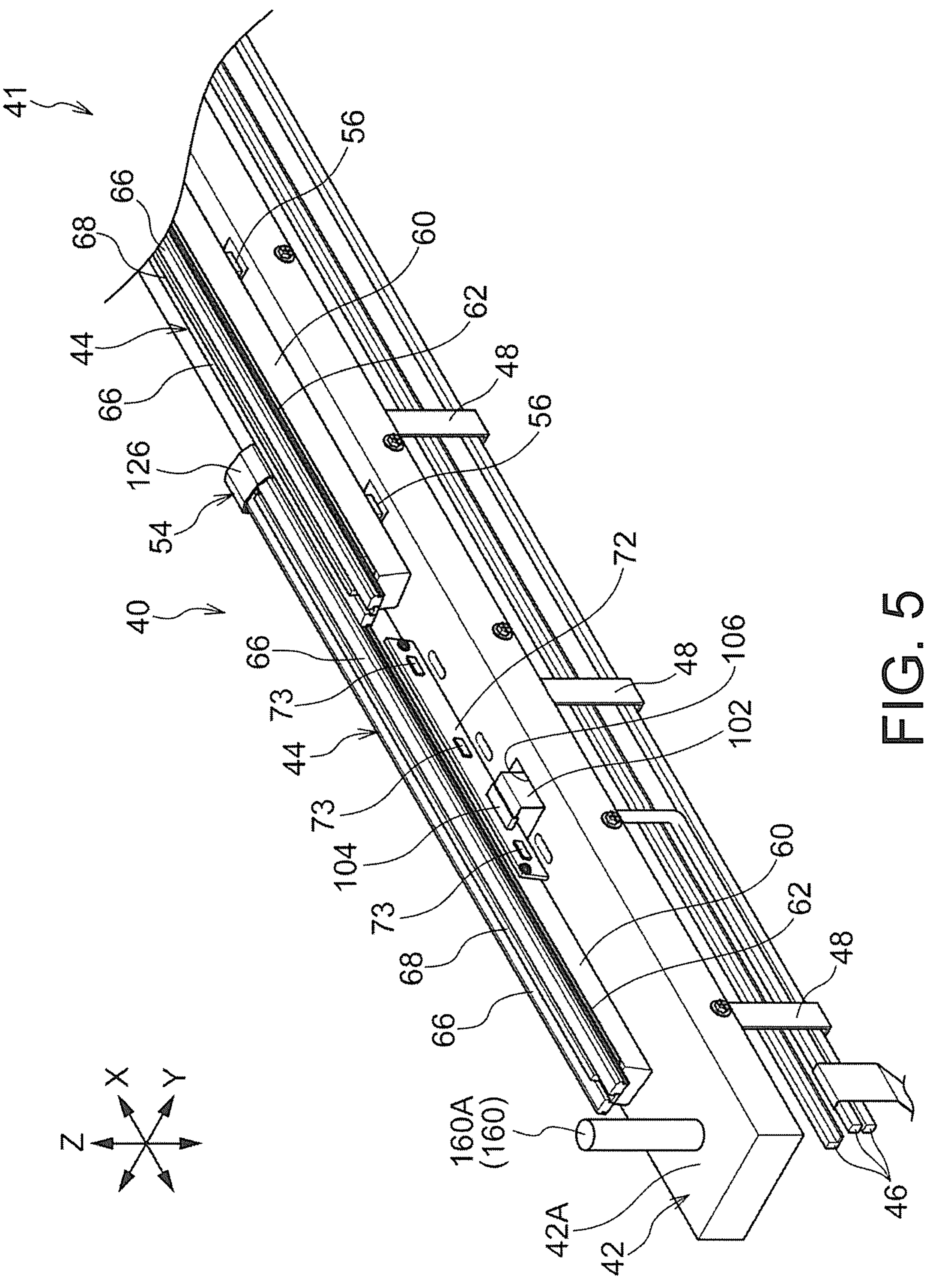
FIG. 5 is a partially enlarged perspective view of the exposure device.

As illustrated in FIGS. 4 and 5, the exposure device 40 includes harnesses 46 electrically connected to the three light radiators 44, multiple brackets 48 that hold the harnesses 46, and a lower covering 50 covering the harnesses 46 and the brackets 48. The harnesses 46 form an assemblage or a bundle of multiple wires used for power supply. The brackets 48 are attached to the substrate 42, and extend from the substrate 42 to the second side (lower side in the vertical direction in FIG. 2) in the direction of arrow Z. The lower covering 50 is attached to the second side (lower side in the vertical direction in FIG. 2) of the substrate 42 in the direction of arrow Z.

As illustrated in FIGS. 2 and 3, the exposure device 40 includes side coverings 52 that cover the sides of the three light radiators 44. The side coverings 52 have a plate shape and lower end portions attached to both sides of the substrate 42 in the cross direction. The exposure device 40 includes cleaning devices 54 that clean lenses 68 of the light radiators 44. The lenses 68 will be described below.

Figure 6:
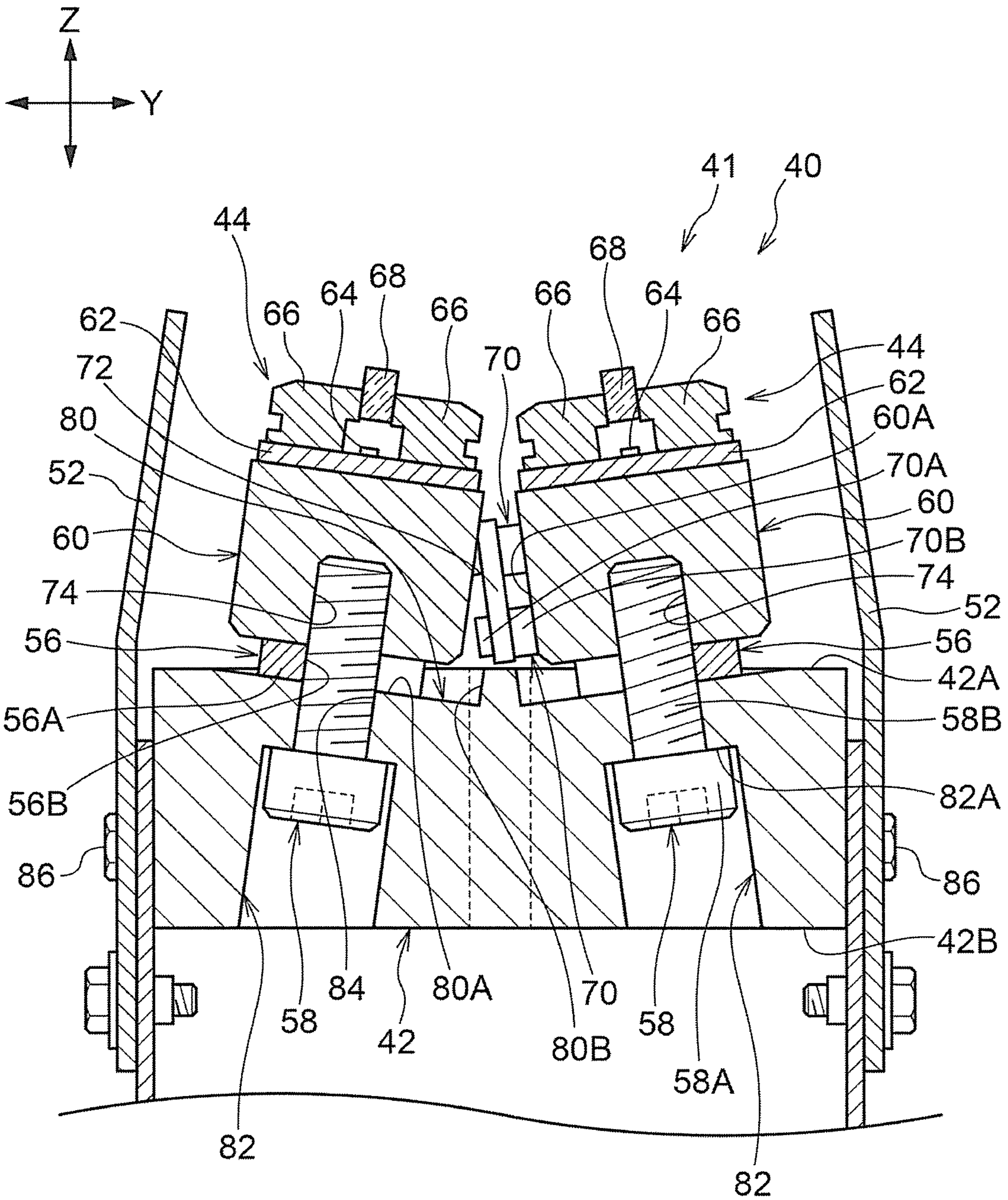
FIG. 6 is a cross-sectional view of the multiple light radiators in the exposure device taken in a cross direction.

As illustrated in FIGS. 5 and 6, the exposure device 40 includes multiple spacers 56 held between the substrate 42 and the light radiators 44, and fastening members 58 that fasten the light radiators 44 to the substrate 42 with the multiple spacers 56 interposed therebetween. The fastening members 58 each have, for example, a helical groove for fastening. In other words, each fastening member 58 is a member with a screw mechanism, such as a screw or a bolt.

Positioning portions 160 extending upward in the vertical direction are disposed at both ends of the substrate 42 in the first direction. The positioning portions 160 are restricted by restrictors 34 disposed at drum flanges 33, serving as examples of support members that rotatably support both ends of the photoconductor drum 32, to fix the position of the light emitter 41 with respect to the photoconductor drum 32 in the direction perpendicular to the light emission direction. More specifically, the positioning portions 160 fix the position of the light emitter 41 in the cross direction (Y direction) with respect to the photoconductor drum 32.

As illustrated in FIGS. 5 to 8, the substrate 42 is formed from a thin rectangular-parallelepiped member. The substrate 42 is disposed to face the photoconductor drum 32 (FIG. 1) along the full length in the axial direction.

Recesses 80 that receive the spacers 56 are formed in a surface 42A of the substrate 42 on the upper side in the vertical direction (direction of arrow Z) (refer to FIG. 6). For example, three spacers 56 are disposed at intervals in the first direction for each of the light radiators 44. In the present exemplary embodiment, three spacers 56 are disposed for each of the three light radiators 44.

Each of the recesses 80 includes a slope 80A that forms a bottom surface and is inclined with respect to the surface 42A of the substrate 42, a vertical wall 80B disposed at a downward end of the slope 80A, and two opposing vertical walls (not illustrated) on both sides of the slope 80A (refer to FIG. 5). For example, the slopes 80A facing the two light radiators 44 disposed on the first side of the substrate 42 in the cross direction are inclined in the direction opposite to the direction in which the slope 80A facing the one light radiator 44 disposed on the second side of the substrate 42 in the cross direction is inclined. In the light emitter 41, the slopes 80A inclined opposite to each other adjust light to be applied to the center portion of the photoconductor drum 32 (refer to FIG. 1) using the two light radiators 44 disposed on the first side of the substrate 42 in the cross direction and the one light radiator 44 disposed on the second side of the substrate 42 in the cross direction.

When the light emitter 41 includes only one light radiator 44, the light emission direction of the light emitter 41 toward the photoconductor drum 32 corresponds to the optical axis direction of the light radiator 44. On the other hand, when the light emitter 41 includes multiple light radiators 44 as in the present exemplary embodiment, the direction toward the focal point from the middle point in the cross direction (Y direction) of the substrate 42 between the principal points of the light radiators 44 when viewed in the first direction (X direction) of the substrate 42 is a light emission direction. In the present exemplary embodiment, the positions and the angles of the light emitters 41 are adjusted so that the direction toward the center of the photoconductor drum 32 is aligned with the light emission direction.

In the present exemplary embodiment, the substrate 42 is formed from a metal block. Instead of including typical sheet metal that is shaped by bending, the metal block in the present exemplary embodiment has a shape used as a substrate of the exposure device 40 and a thickness that is not substantially bendable. For example, the substrate 42 is formed from a metal block with a thickness of higher than or equal to 10% of the width of the substrate 42. More specifically, the substrate 42 may be formed from a metal block with a thickness of higher than or equal to 20% and lower than or equal to 100% of the width of the substrate 42.

Unlike a full-color printer for commercial printing, an existing wide-image forming apparatus is used to output monochrome images for which a high image quality is not desired, and thus includes a substrate formed from sheet metal. On the other hand, the image forming apparatus 10 according to the exemplary embodiment is a full-color printer for commercial printing for which a high image quality is desired. Thus, to reduce the effect of deflection of the substrate 42 on the image quality, a metal block that is more rigid than sheet metal is used.

The substrate 42 is formed from, for example, steel or stainless steel. Alternatively, the substrate 42 may be formed from a metal block made of steel or stainless steel. For example, the metal block may be made of aluminum that is lighter in weight and has higher thermal conductivity than steel or stainless steel. In the present exemplary embodiment, heat generated by light sources 64 is mostly radiated by support bodies 60. Thus, the substrate 42 is formed from steel or stainless steel by giving priority in rigidity rather than thermal conductivity or weight.

The thickness of the substrate 42 in the vertical direction (direction of arrow Z) is preferably larger than the thickness of the support bodies 60 forming the light radiators 44. Thus, the rigidity of the substrate 42 (flexural rigidity in the direction of arrow Z) is larger than the rigidity of the light radiators 44. The thickness of the substrate 42 in the vertical direction is preferably larger than or equal to 5 mm, more preferably larger than or equal to 10 mm, and further more preferably larger than or equal to 20 mm.

As illustrated in FIG. 6, recessed portions 82 set back toward the spacers 56, that is, toward the recesses 80 are formed in an underside 42B of the substrate 42 opposite to the surface 42A. The recessed portions 82 are formed at positions corresponding to the recesses 80 of the substrate 42. The recessed portions 82 are obliquely formed from the underside 42B of the substrate 42 toward the center portion of the substrate 42 in the cross direction (Y direction). For example, the recessed portions 82 are circular when viewed from the underside 42B of the substrate 42. The inner diameter of each recessed portion 82 is larger than the outer diameter of a head 58A of the corresponding fastening member 58. A through-hole 84 in the substrate 42 through which a shank 58B of each fastening member 58 extends is formed in a bottom surface 82A of the corresponding recessed portion 82. The through-hole 84 is open in the slope 80A of each recess 80.

As illustrated in FIGS. 2 to 7, the three light radiators 44 have the same structure, as described above. For example, the two light radiators 44 on the first side of the substrate 42 in the cross direction and the one light radiator 44 on the second side of the substrate 42 in the cross direction are disposed to be symmetrical with respect to the cross direction of the substrate 42.

As illustrated in FIG. 6, each of the light radiators 44 includes a support body 60 extending in the first direction (direction of arrow X), and a light-emitting device substrate 62 supported on a surface of the support body 60 opposite, in the vertical direction (direction of arrow Z), to the surface facing the substrate 42 (supported on the upper surface in the vertical direction in the present exemplary embodiment). Multiple light sources 64 are arranged on the light-emitting device substrate 62 in the first direction. In the present exemplary embodiment, each of the light sources 64 includes multiple light-emitting devices. For example, each light source 64 is a light-emitting device array including a semiconductor substrate and multiple light-emitting devices arranged on the semiconductor substrate in the first direction. In the present exemplary embodiment, the light-emitting device arrays each formed from the light source 64 are disposed on the light-emitting device substrate 62 in a manner staggered in the first direction. Instead of a light-emitting device array, each light source 64 may be a single light-emitting device. Each light-emitting device is formed from, for example, a light-emitting diode, a light emitting thyristor, or a laser element. When arranged in the first direction, the light-emitting devices have, for example, a resolution of 2400 dpi. The light-emitting device substrate 62 is a substrate for allowing at least one of the multiple light sources 64 to emit light. FIG. 6 illustrates only one light source 64 disposed on each of the light radiators 44, and omits illustration of other light sources.

Each of the light radiators 44 includes a pair of attachments 66 disposed on the surface of the light-emitting device substrate 62 opposite to the surface on which the support body 60 is disposed, and a lens 68 held between upper end portions of the pair of attachments 66.

The pair of attachments 66 and the lens 68 extend in the first direction of the support body 60 (refer to, for example, FIG. 4). The lens 68 is disposed to oppose the multiple light sources 64 while leaving a space between the lens 68 and the multiple light sources 64. In the exposure device 40, light emitted from the multiple light sources 64 passes through the lens 68, and is applied to the surface of the photoconductor drum 32 (refer to FIG. 1) serving as an irradiated object.

Each support body 60 is formed from a rectangular parallelepiped member. In the present exemplary embodiment, as in the substrate 42, the support body 60 is formed from a metal block. For example, the support body 60 is formed from steel or stainless steel. Alternatively, the substrate 42 may be formed from a metal block made of a material other than steel or stainless steel. For example, the metal block may be made of aluminum that is lighter in weight and has higher thermal conductivity than steel or stainless steel. However, when the substrate 42 and the support body 60 have different coefficients of thermal expansion, distortion or deflection may occur. Thus, in view of reducing distortion or deflection, the substrate 42 and the support body 60 are preferably formed from the same material.

A threaded hole 74 into which the shank 58B of each fastening member 58 is fastened is formed in the surface of the support body 60 facing the substrate 42 (refer to FIG. 6). The threaded hole 74 is formed at a position opposing the corresponding through-hole 84 in the substrate 42.

While the fastening members 58 are received in the recessed portions 82 in the substrate 42 and the shanks 58B of the fastening members 58 extend through the through-holes 84 in the substrate 42, the shanks 58B of the fastening members 58 are fastened to the threaded holes 74 of the support body 60 with the spacers 56 interposed therebetween. Thus, the light radiators 44 are fastened to the substrate 42 with the fastening members 58 in the recessed portions 82 of the substrate 42. While the light radiators 44 are fastened to the substrate 42 with the fastening members 58, the spacers 56 are interposed between the substrate 42 and the support bodies 60.

A method for fastening, with the fastening members 58, the light radiators 44 from the surfaces (light emitting surfaces) of the support bodies 60 to the surface of the substrate 42 is conceivable. However, unlike a support body made of a resin material or formed from sheet metal, each support body 60 according to the present exemplary embodiment is formed from a metal block with a heavy mass. Thus, the fastening members 58 are correspondingly to have a large size and mass. This structure involves leaving a space for the large-sized fastening members 58 over the surface of the support body 60, and size increase of the support body 60. To avoid this, in the present exemplary embodiment, each support body 60 is fastened from the underside.

In a structure including the fastening members 58 at not only both ends of the support body 60 but also at the center portion, the existence of the light source 64 at the center portion prevents fastening of the support body 60 from the surface side. Thus, the structure where both ends and the center portion of the support body 60 are fastened only involves fastening from the underside of the substrate 42.

When viewed in the optical axis direction of the light sources 64, the threaded holes 74 and the recessed portions 82 of the substrate 42 are located to overlap the light sources 64. Compared to the structure where the threaded holes 74 and the recessed portions 82 are located not to overlap the light sources 64, this structure facilitates dissipation of heat generated from the light sources 64 to the substrate 42 through the fastening members 58.

As illustrated in FIGS. 6, 7, 8, and 9, a driving substrate 72 is attached to the support body 60 of each light radiator 44 with fittings 70. The driving substrate 72 is an example of a substrate. The driving substrate 72 extends in the first direction (direction of arrow X). The length of each driving substrate 72 in the first direction is shorter than the length of the corresponding support body 60 in the first direction (refer to FIG. 8). Each driving substrate 72 is a substrate that drives the corresponding light radiator 44, and formed from, for example, an application specific integrated circuit (ASIC) substrate.

Figure 9:
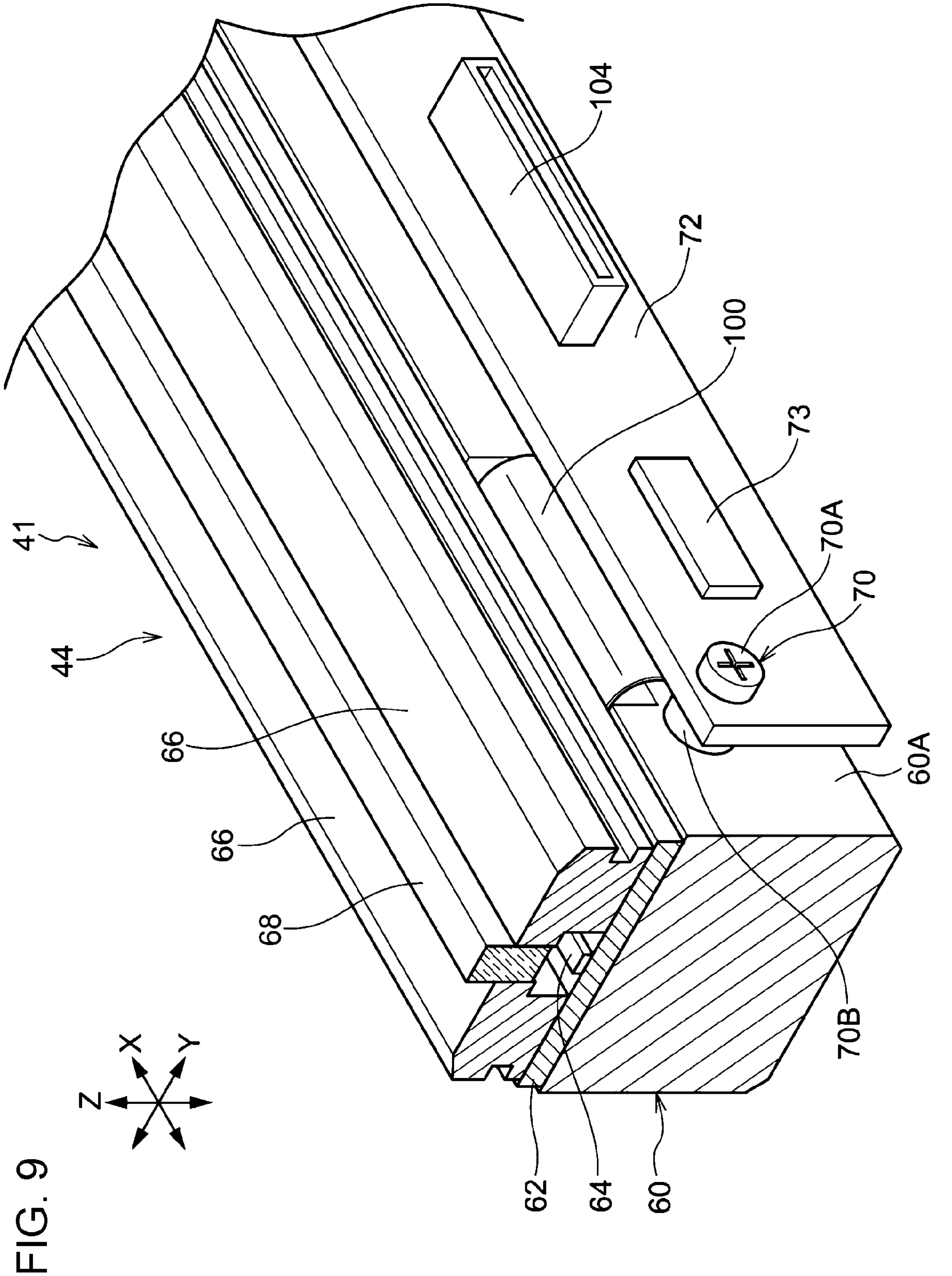
FIG. 9 is a perspective view of part of the light radiator taken in the cross direction.

Each fitting 70 includes a fastening bolt 70A and a tube 70B disposed between the support body 60 and the driving substrate 72 (refer to FIG. 9). For example, the tube 70B is made of metal, and joined to the driving substrate 72 by, for example, soldering. Although not illustrated, the driving substrate 72 has openings continuous with the through-holes of the tubes 70B. The shank of each fastening bolt 70A extends through the tube 70B. The shank of the fastening bolt 70A extends through the tube 70B from the side closer to the driving substrate 72, and is fastened to the support body 60 to attach the driving substrate 72 to the support body 60. The driving substrate 72 is attached to the support body 60 with two fittings 70 disposed at both ends of the driving substrate 72 in the first direction.

Figure 7:
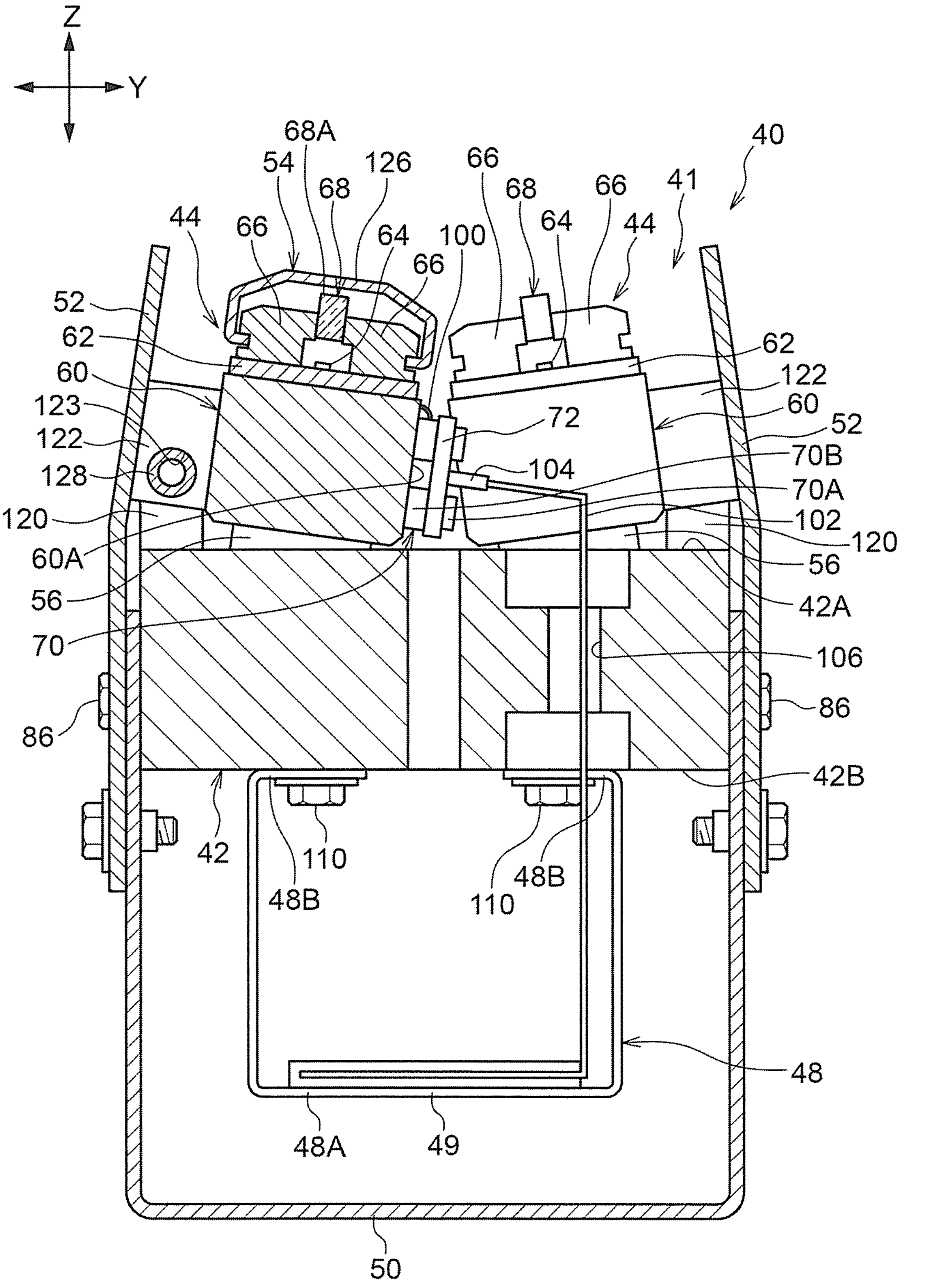
FIG. 7 is a cross-sectional view of the exposure device taken in the cross direction.

The surface of the driving substrate 72 (that is, flat surface) extends along an inner side portion 60A of the support body 60 in the cross direction of the substrate 42 (refer to FIG. 7). The inner side portion 60A of the support body 60 refers to the side of the substrate 42 closer to the center portion in the cross direction.

The tube 70B of each fitting 70 forms a gap between the inner side portion 60A of the support body 60 and the surface (flat surface) of the driving substrate 72. Specifically, the driving substrate 72 is attached to the inner side portion 60A of the support body 60 of the corresponding light radiator 44 with the fittings 70 without in direct contact with the inner side portion 60A.

The inner side portion 60A of the support body 60 is a slope inclined inward with respect to the surface 42A of the substrate 42. As in the case of the inner side portion 60A, the flat surface of the driving substrate 72 is also inclined inward with respect to the surface 42A of the substrate 42.

The driving substrate 72 is disposed on each of the three light radiators 44 at the inner side portion 60A of the support body 60.

As illustrated in FIGS. 3 and 4, in a side view, the driving substrate 72 disposed on one light radiator 44 is located not to overlap another light radiator 44 adjacent to the light radiator 44. The driving substrates 72 of the three light radiators 44 disposed on the substrate 42 have the same length in the first direction (direction of arrow X), and are shorter than a portion of the light radiator 44 disposed at the center portion in the first direction that does not overlap the light radiators 44 on both sides in the first direction.

Figure 8:
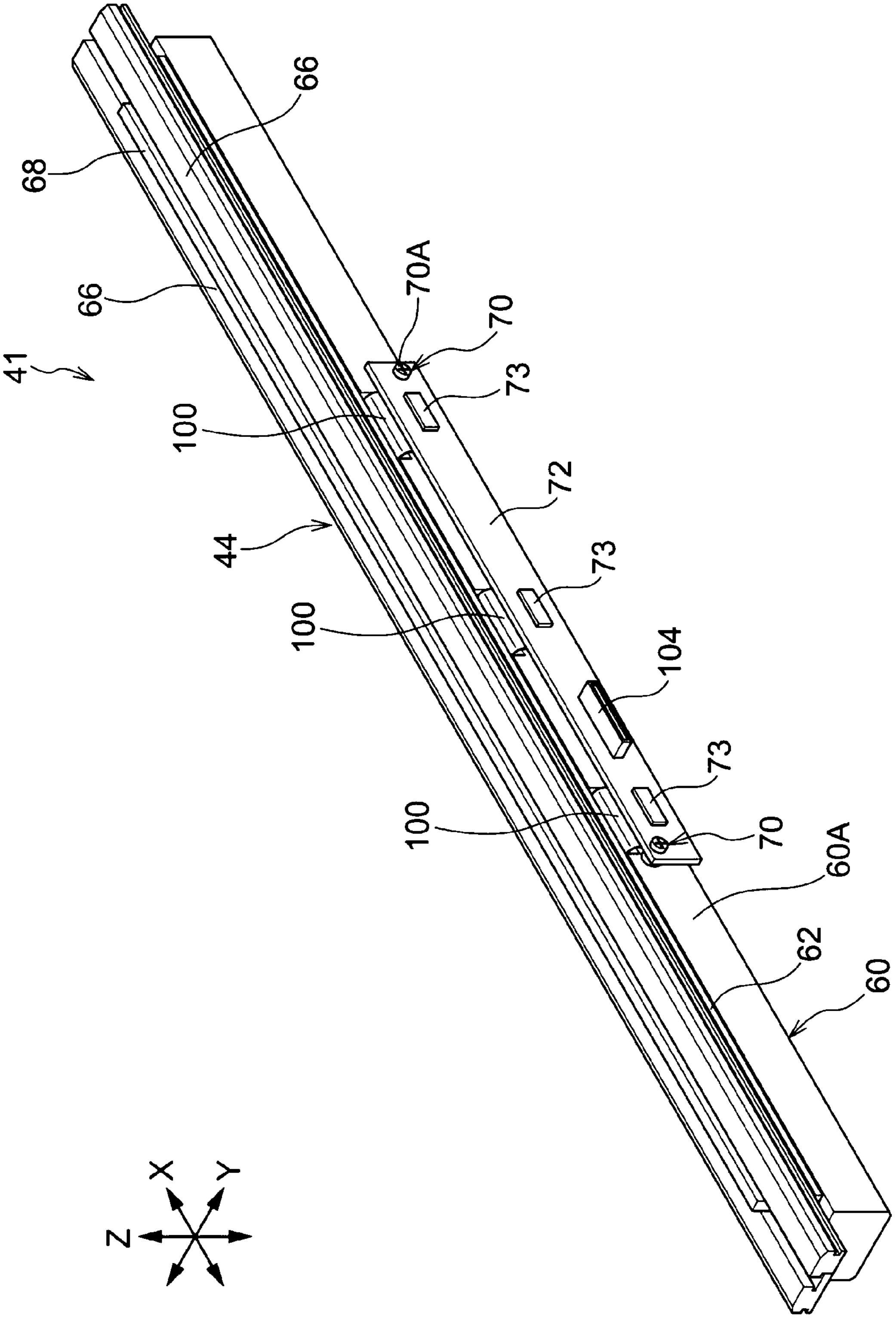
FIG. 8 is a perspective view of a light radiator in the exposure device.

As illustrated in FIGS. 7, 8, and 9, three flexible cables 100 are connected to the light-emitting device substrate 62 disposed on the support body 60. The three flexible cables 100 extend to the outer side of the support body 60 from the upper portion of the inner side portion 60A of the support body 60. The three flexible cables 100 extending to the outer side of the support body 60 are electrically connected to three driving elements 73 disposed on the driving substrate 72. Examples usable as the driving elements 73 include integrated circuits.

At a portion of each driving substrate 72 other than both ends in the first direction, a connector 104 to which a flat cable 102 from the outer side of the corresponding light radiator 44 is electrically connected is disposed. A connection port of the connector 104 extends in a direction crossing the surface (flat surface) of the driving substrate 72. A connection portion of the flat cable 102 is insertable into and removable from the connector 104 in the direction crossing the surface (flat surface) of the driving substrate 72. The flat cable 102 is an example of a wire.

As illustrated in FIG. 7, the flat cable 102 connected to the connector 104 extends from the driving substrate 72 in a direction away from the support body 60. The substrate 42 has through portions 106 that extend through in the vertical direction (direction of arrow Z) at positions corresponding to the positions of the driving substrate 72 where the flat cables 102 are connected. The through portions 106 are formed in the substrate 42 on the side of the driving substrate 72 in the cross direction of the substrate 42 and at positions on the side of the driving substrate 72 opposite to the side where the light radiators 44 are disposed (that is, positions where the light radiators 44 are not disposed). The flat cables 102 are inserted into the through portions 106 of the substrate 42 to be routed to the inner side of the lower covering 50 facing the underside 42B of the substrate 42. In other words, the flat cables 102 are disposed in the inner side of the lower covering 50.

As illustrated in FIGS. 4 and 5, each flat cable 102 is connected with the connector 104 interposed therebetween to the driving substrate 72 disposed on each of the three light radiators 44. The substrate 42 has the through portions 106 on the side of the driving substrates 72 attached to the three light radiators 44. The flat cable 102 for each of the three light radiators 44 is received in the corresponding through portion 106 in the substrate 42, and extends to the inner side of the lower covering 50 facing the underside 42B of the substrate 42 (refer to FIG. 7).

For example, the light radiators 44 have a dimension in the height direction longer than the dimension in the width direction that is perpendicular to the first direction (perpendicular to the direction of arrow X). Specifically, the light radiators 44 have a dimension in the vertical direction (direction of arrow Z) longer than the dimension in the cross direction. Thus, the center of gravity of the light radiators 44 is higher than when the light emitter has a dimension in the height direction shorter than the dimension in the width direction perpendicular to the first direction.

As illustrated in FIG. 6, the spacers 56 are held between the substrate 42 and the light radiators 44 in the optical axis direction of the light sources 64. For example, each spacer 56 has a plate shape, and is made of a single member. In the present exemplary embodiment, each spacer 56 has a U shape when viewed in the optical axis direction of the light sources 64. Each spacer 56 includes a body 56A and a hole 56B in one side of the body 56A.

Each spacer 56 is disposed on the slope 80A of the corresponding recess 80 in the substrate 42. Each spacer 56 has a thickness larger than or equal to the depth of the recess 80 at the position where the spacer 56 is disposed on the slope 80A. The fastening members 58 fasten the light radiators 44 to the substrate 42 while imposing a compression load on the spacers 56.

As illustrated in FIG. 7, the brackets 48 have a function of holding the flat cables 102. The brackets 48 are examples of a holding member. More specifically, each bracket 48 includes a U-shaped support portion 48A, protruding from the underside 42B of the substrate 42 in a direction away from the light radiators 44, and a pair of attachment portions 48B bent inward (that is, toward the inner side of the substrate 42 in the cross direction) from the upper end portion of the support portion 48A. The support portion 48A has a flat-surface portion 49 facing the underside 42B of the substrate 42 at the middle of the lower portion of the U shape. The support portion 48A has a portion opposite to the flat-surface portion 49 open toward the substrate 42. The pair of attachment portions 48B are attached to the substrate 42 with fastening members 110 while being in surface contact with the underside 42B of the substrate 42.

The brackets 48 are spaced apart from each other in the first direction of the substrate 42 (refer to FIG. 5). Each flat cable 102 is held at the flat-surface portion 49 of the support portion 48A. The flat cables 102 are supported by the multiple brackets to be arranged in the first direction of the substrate 42 in the inner side of the lower covering 50.

As illustrated in FIGS. 4 and 7, the lower covering 50 covers the harnesses 46 and the flat cables 102 electrically connected to the three light radiators 44. The lower covering 50 is attached to the lower side of the substrate 42 in the vertical direction (that is, on the underside 42B of the substrate 42 illustrated in FIG. 5). The lower covering 50 protrudes from the substrate 42 in a direction away from the light radiators 44, and covers part of the underside 42B of the substrate 42. In the present exemplary embodiment, the lower covering 50 has a U-shaped cross section. The upper end portions of the lower covering 50 are attached to both sides of the substrate 42 in the cross direction with multiple fastening members 86. The lower covering 50 is attachable to and removable from the substrate 42 by fastening or removing the multiple fastening members 86.

The lower covering 50 raises the substrate 42 when having the bottom placed on a horizontal plane. When the substrate 42 formed from a metal block is raised, the center of gravity of the exposure device 40 is raised.

As illustrated in FIGS. 2, 6, and 7, the side coverings 52 are disposed on both edges of the substrate 42 in the cross direction. The side coverings 52 extend in the first direction on the sides of the three light radiators 44. Thus, the side coverings 52 have a function of protecting the three light radiators 44 from the outside.

In a side view of the exposure device 40 (when viewed in the direction of arrow Y), the side coverings 52 are disposed to overlap the three light radiators 44. The side coverings 52 are longer in the first direction (direction of arrow X) than the longitudinal area of the substrate 42 where the three light radiators 44 are disposed (refer to FIGS. 2 and 3).

As illustrated in FIG. 7, a support portion 122 that supports the corresponding side covering 52 is disposed on the inner side of the side covering 52. An attachment 120 is disposed on the surface 42A of the substrate 42 at the end in the cross direction to support the support portion 122. The support portion 122 is in contact with the corresponding side covering 52 to support the side covering 52 so that the side covering 52 does not fall toward the light radiators 44. The support portions 122 are disposed on the side coverings 52 on both sides of the substrate 42 in the cross direction. Although not illustrated, the support portions 122 are disposed at intervals in the first direction of the side coverings 52.

Positioning Portions 160

Figure 13:
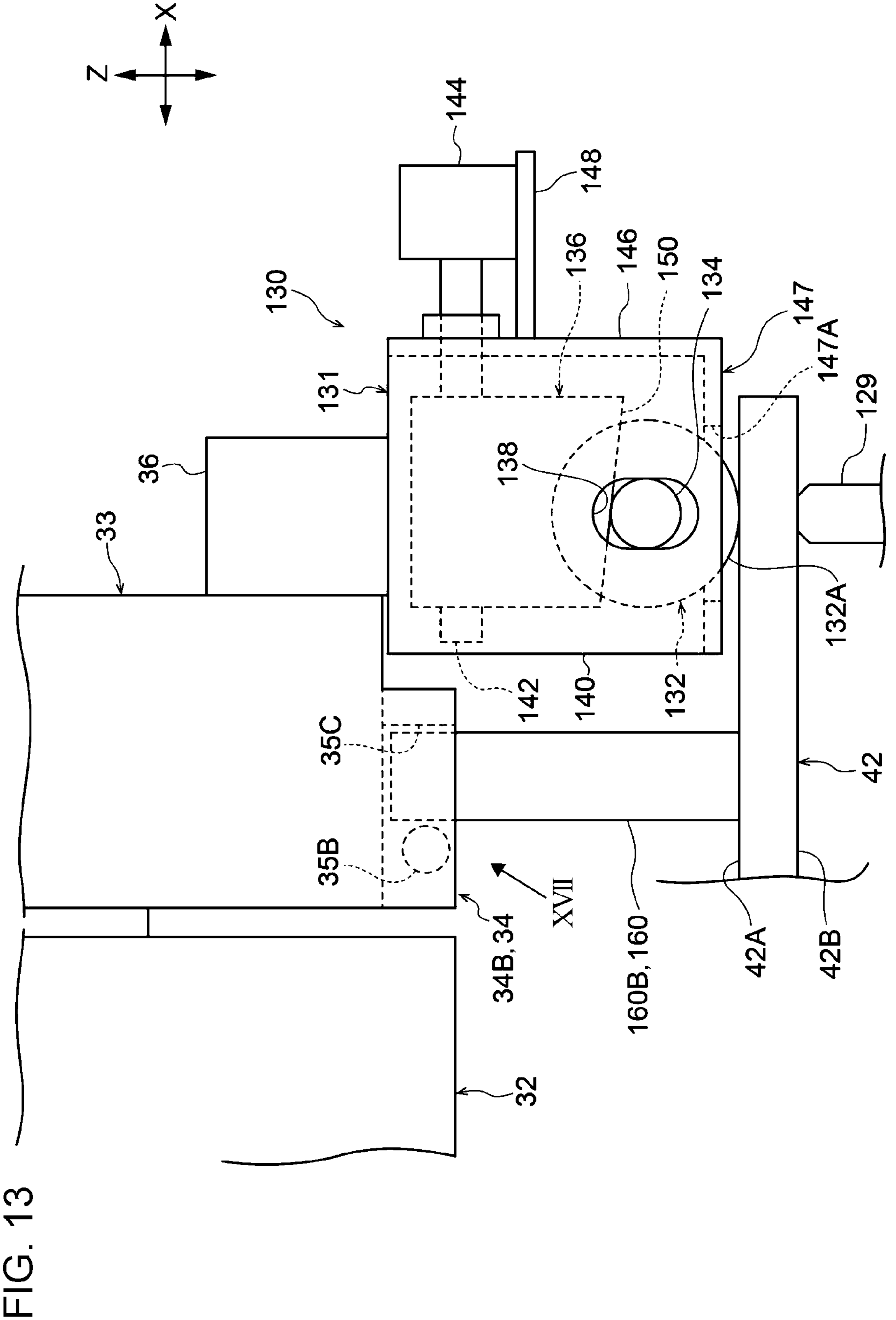
FIG. 13 is a side view of a positioning portion and an adjuster on a second side of the exposure device in the apparatus depth direction.
Figure 14:
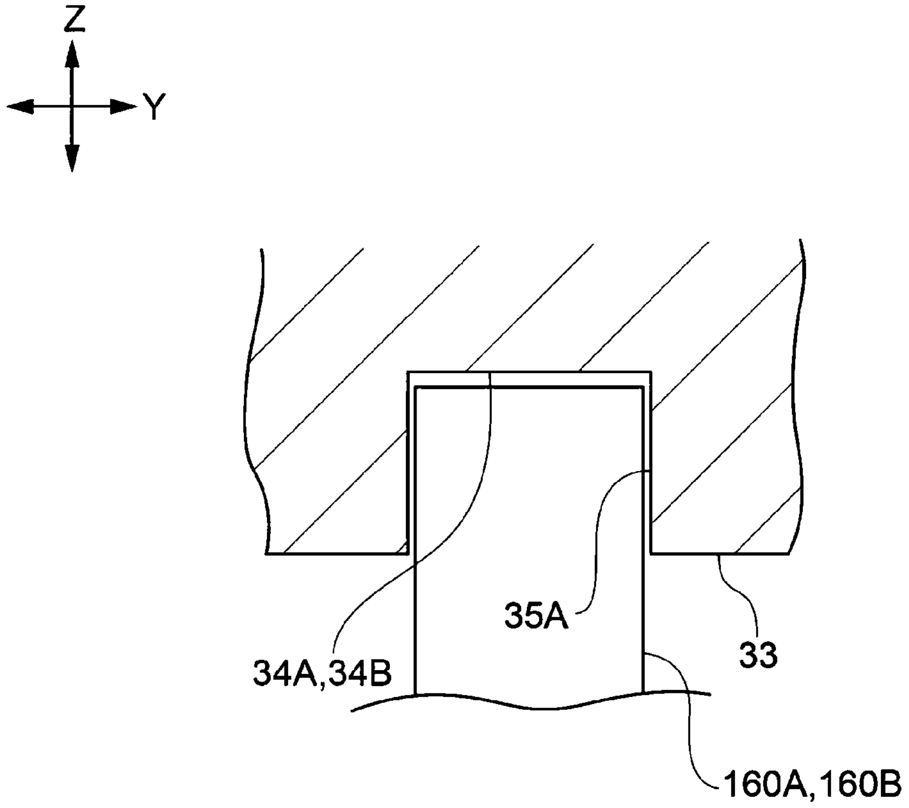
FIG. 14 is a cross-sectional view of the positioning portion and the adjuster taken along line XIV-XIV in FIG. 10.

As illustrated in FIGS. 10 and 13, each of the positioning portions 160 is disposed between the substrate 42 and the photoconductor drum 32 to fix the position of the light emitter 41 with respect to the photoconductor drum 32 in a direction perpendicular to the light emission direction of the light emitter 41. Specifically, each positioning portion 160 is a portion that fixes the position of the light emitter 41 in a Y direction among the directions perpendicular to the light emission direction. In the present embodiment, the positioning portions 160 include a first positioning portion 160A disposed at a first end portion (on the left side in FIG. 10, that is, the near side in the apparatus depth direction) in a direction in which the substrate 42 extends (in the X direction), and a second positioning portion 160B disposed at a second end portion (on the right side in FIG. 13, that is, the far side in the apparatus depth direction) in a direction in which the substrate 42 extends (X direction). Components constituting the first positioning portion 160A and the second positioning portion 160B are the same, and thus, the same portions are described as those for the positioning portions 160.

The positioning portions 160 come into contact with the drum flanges 33 to fix the position of the light emitter 41 in the Y direction with respect to the photoconductor drum 32. More specifically, each positioning portion 160 is a cylindrical protrusion protruding from the surface 42A of the substrate 42 toward the corresponding drum flange 33. The shape of each positioning portion 160 is not limited to this. Each positioning portion 160 may have a polygonal or elliptic columnar shape or another shape. Each positioning portion 160 formed from a cylindrical protrusion fits to the restrictor 34 of the corresponding drum flange 33. In the present exemplary embodiment, as described above, both end portions of the photoconductor drum 32 in the axial direction are rotatably supported by the pair of drum flanges 33. The pair of drum flanges 33 are attached to an apparatus body (a frame of the image forming unit 14) not illustrated. A first restrictor 34A is disposed on the drum flange 33 on the near side (on the left side in FIG. 10) in the apparatus depth direction, and a second restrictor 34B is disposed on the drum flange 33 on the far side (on the right side in FIG. 13) in the apparatus depth direction of the pair of drum flanges 33. The first positioning portion 160A fits to the first restrictor 34A, and the second positioning portion 160B fits to the second restrictor 34B.

Figure 16:
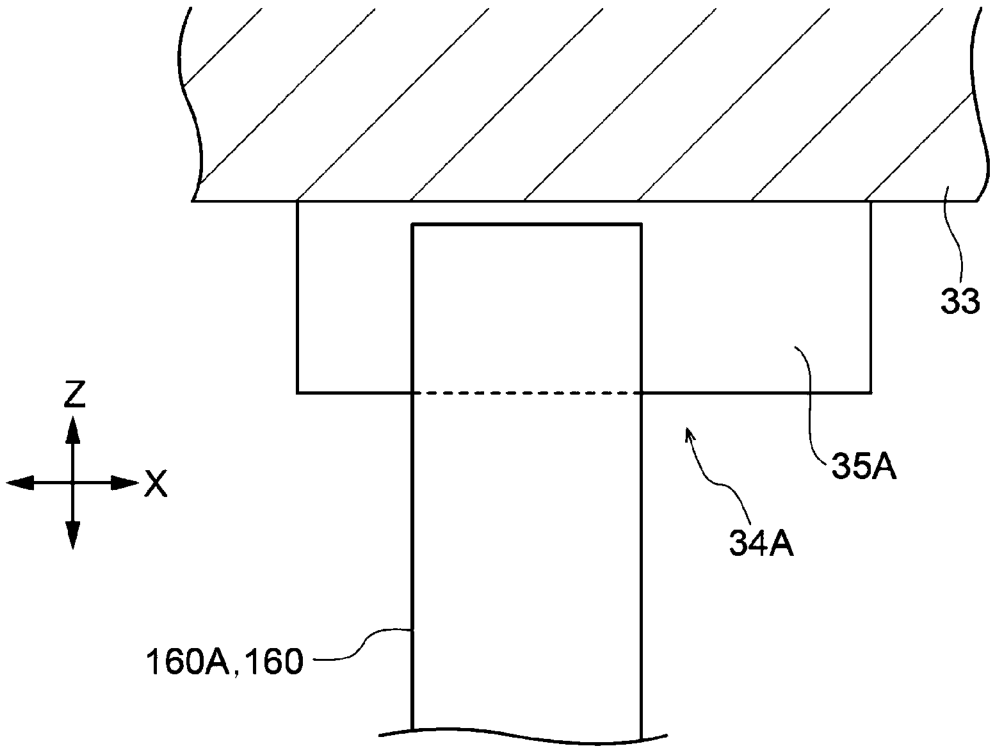
FIG. 16 is an enlarged cross-sectional view of a portion indicated with arrow XVI in FIG. 10.

As illustrated in FIG. 16, the first restrictor 34A is a recess extending in the X direction. In other words, the first restrictor 34A is a groove extending in the X direction and having both ends open. When the first positioning portion 160A fits to the first restrictor 34A, a pair of wall surfaces 35A of the first restrictor 34A opposing in the Y direction restrict movement of the first positioning portion 160A in the Y direction. Specifically, as a result of being restricted by the first restrictor 34A, the first positioning portion 160A fixes the position of the light emitter 41 in the Y direction. On the other hand, the first restrictor 34A that is a groove extending in the X direction does not restrict movement of the first positioning portion 160A in the X direction.

Figure 17:
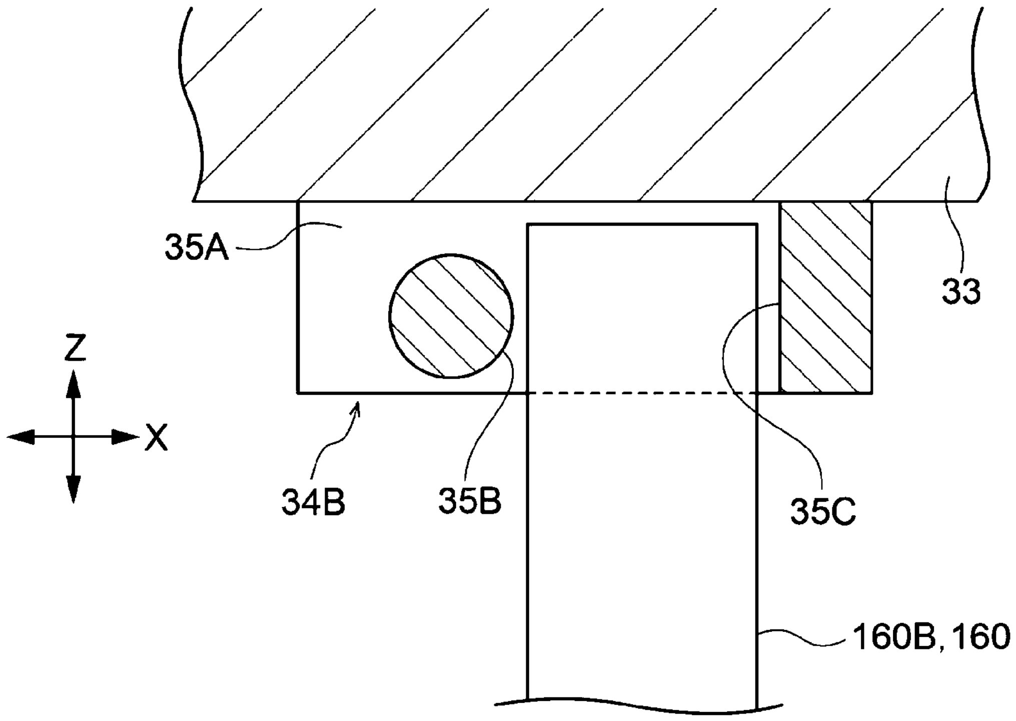
FIG. 17 is an enlarged cross-sectional view of a portion indicated with arrow XVII in FIG. 13.

As illustrated in FIG. 17, the second restrictor 34B is a recess extending in the X direction. In other words, the second restrictor 34B is a groove extending in the X direction and has a first end (right end in FIG. 17) in the X direction closed by a wall surface 35C. The second restrictor 34B has a second end (left end in FIG. 17) in the X direction closed by a cylindrical portion 35B. The cylindrical portion 35B extends between a pair of wall surfaces 35A of the second restrictor 34B opposing in the Y direction. When the second positioning portion 160B fits to the second restrictor 34B, the pair of wall surfaces 35A of the second restrictor 34B opposing in the Y direction restrict movement of the second positioning portion 160B in the Y direction. As the wall surface 35C and the cylindrical portion 35B are disposed at a distance in the X direction, the second restrictor 34B also restricts movement of the second positioning portion 160B in the X direction. Specifically, by being restricted by the second restrictor 34B, the second positioning portion 160B fixes the position of the light emitter 41 in the X and Y directions. A portion of the second restrictor 34B in the X direction that comes into contact with the first positioning portion 160A is an outer periphery of the cylindrical portion 35B. Specifically, the portion of the second restrictor 34B in the X direction that comes into contact with the first positioning portion 160A has an arc shape.

Position Adjuster 130

Figure 11:
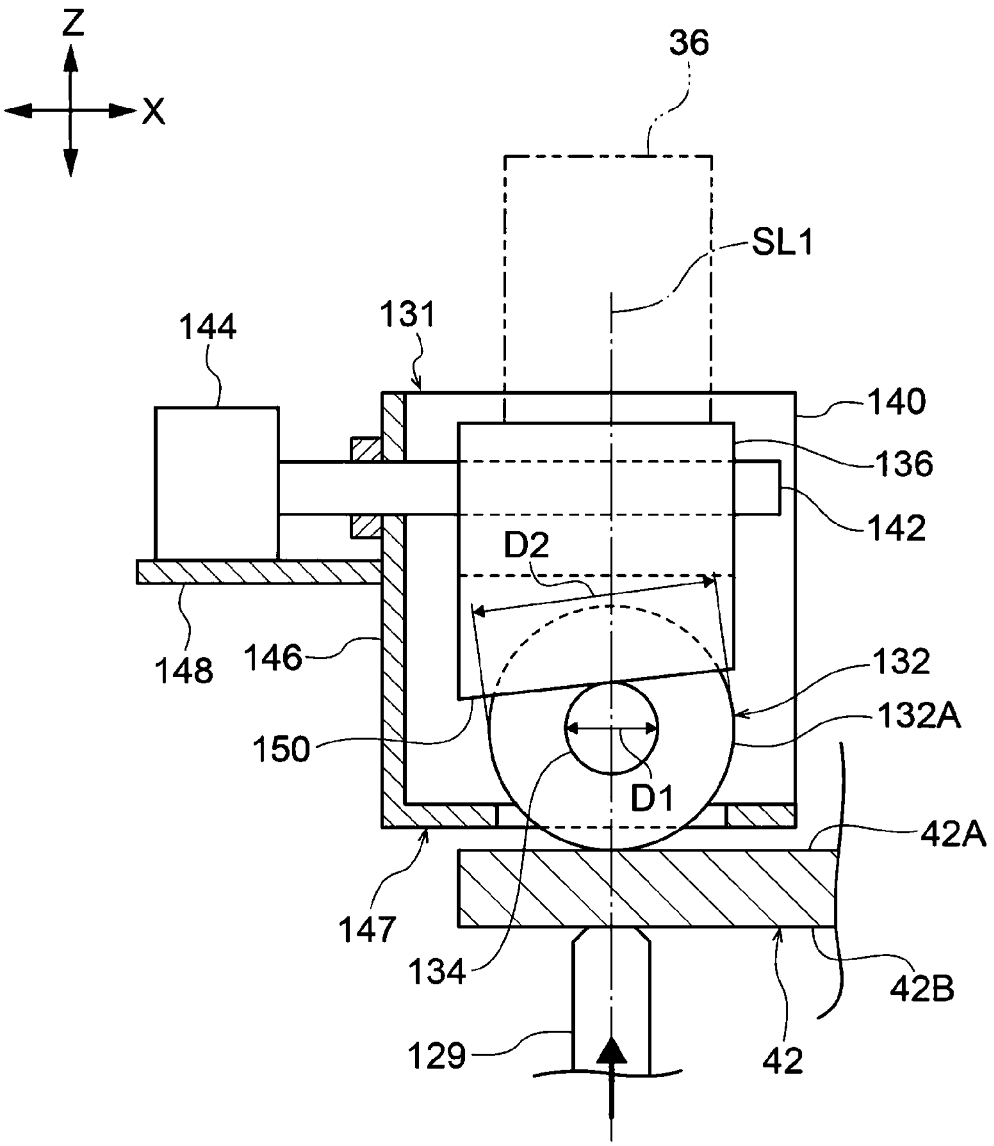
FIG. 11 is a cross-sectional side view of part of the adjuster of the exposure device.
Figure 12:
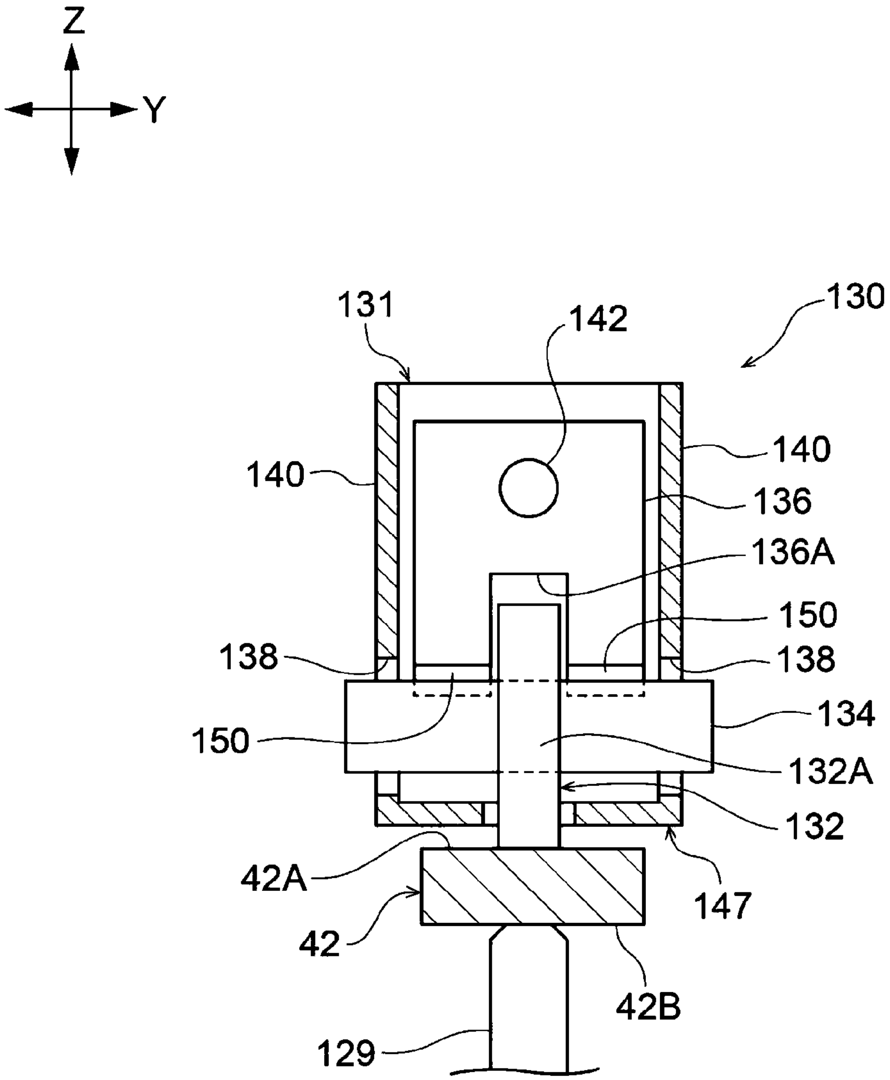
FIG. 12 is a cross-sectional front view of part of the adjuster of the exposure device.

As illustrated in FIGS. 10 to 12, each position adjuster 130 serving as an example of an adjuster is a mechanism for adjusting the distance between the light emitter 41 and the photoconductor drum 32. More specifically, each position adjuster 130 adjusts the position of the light emitter 41 in the light emission direction with respect to the photoconductor drum 32. More specifically, each position adjuster 130 moves the light emitter 41 in the light emission direction to adjust the position of the light emitter 41 in the light emission direction with respect to the photoconductor drum 32. In the present exemplary embodiment, the light emission direction of the light emitter 41 is substantially the same as the Z direction.

As illustrated in FIG. 10, each position adjuster 130 includes a contact member 132, a shaft member 134, and a mover 136.

Contact Member 132

As illustrated in FIG. 10, the contact member 132 is a member having an outer peripheral surface 132A in contact with the surface 42A of the substrate 42. The contact member 132 has a disk shape, and is rotatably supported by the shaft member 134. More specifically, the contact member 132 is supported by the shaft member 134 to rotate relative to the shaft member 134. For example, the contact member 132 according to the present exemplary embodiment is a ball bearing.

The shaft member 134 is a member that rotatably supports the contact member 132. The shaft member 134 supports the contact member 132 while allowing the contact member 132 to rotate relative to the shaft member 134. As illustrated in FIGS. 10 and 12, the shaft member 134 is a substantially cylindrical shaft, and has both ends in the axial direction received by a pair of receiving portions 138. More specifically, the pair of receiving portions 138 are disposed to oppose each other in the X direction or the cross direction of the substrate 42. The pair of receiving portions 138 allow the shaft member 134 to rotate about the axis or the X direction, and to move in the light emission direction. In other words, the contact member 132 is disposed between the pair of receiving portions 138 of the shaft member 134.

As illustrated in FIG. 12, the pair of receiving portions 138 are long wall holes formed in a pair of support plates 140 opposing each other in the X direction with the contact member 132 in between. These long holes have a length in the Z direction. Thus, the receiving portions 138 are capable of supporting the shaft member 134 while allowing both ends of the shaft member 134 in the axial direction to rotate and to move in the light emission direction. Safety lock stoppers (not illustrated) are attached to both ends of the shaft member 134 in the axial direction.

As illustrated in FIG. 11, an outer diameter D1 of the contact member 132 is larger than an outer diameter D2 of the shaft member 134.

As illustrated in FIG. 11, the mover 136 is a member that is in contact with the shaft member 134 to move the shaft member 134 in the light emission direction of the light emitter 41.

The mover 136 is movable in the X direction. More specifically, each position adjuster 130 includes a feeder 142 and a driving source 144, and the feeder 142 moves the mover 136 in the X direction. In the present exemplary embodiment, the feeder 142 is a feed screw serving as an example of a screw member. The feeder 142 extends through a coupling plate 146 that couples ends of the pair of support plates 140 in the X direction. The driving source 144 is coupled to one end of the feeder 142 in the axial direction. The driving source 144 drives the feeder 142 to rotate. The driving source 144 according to the present exemplary embodiment is, for example, an electric motor, but the present disclosure is not limited to this structure. The driving source 144 is attached to an attachment plate 148 protruding from the coupling plate 146 to the first side (to the left in FIG. 11, or to the near side in the apparatus depth direction) in the X direction. In the present exemplary embodiment, the pair of support plates 140, the coupling plate 146, and the attachment plate 148 constitute a housing 131 of the position adjuster 130. This housing 131 is attached to a frame, not illustrated, included in the image forming unit 14.

The mover 136 includes converters 150 that convert the moving force in the X direction provided by the feeder 142 into the moving force of the shaft member 134 to move in the light emission direction. More specifically, the converters 150 are slopes disposed at portions of the mover 136 that are in contact with the shaft member 134 and that are inclined with respect to the X direction. More specifically, as illustrated in FIG. 12, the mover 136 includes a pair of converters 150 (a pair of slopes), and the pair of converters 150 are in contact with both portions of the shaft member 134 in the axial direction with the contact member 132 in between. For example, the mover 136 according to the present exemplary embodiment is rectangular parallelepiped, and has a groove 136A at a portion corresponding to the contact member 132. The groove 136A receives part of the outer periphery of the contact member 132, and extends in the X direction. The pair of converters 150 are disposed on both sides of the shaft member 134 with the groove 136A in between.

As illustrated in FIG. 10, the substrate 42 is pressed toward the position adjuster 130 by a presser 129 disposed on the side opposite to the side where the position adjuster 130 is disposed. More specifically, the substrate 42 is held with pressure between the position adjuster 130 and the presser 129 in the Z direction. When the mover 136 moves in the X direction, the slopes serving as the converters 150 provide the moving force in the Z direction to the shaft member 134 via the outer peripheral surface of the shaft member 134. When the moving force in the Z direction is provided to the shaft member 134, the moving force is transmitted from the shaft member 134 to the substrate 42 via the contact member 132 to push back the presser 129. Thus, the substrate 42 moves in the Z direction, that is, the position of the substrate 42 is adjusted.

As illustrated in FIG. 12, the contact member 132 and the feeder 142 that extend through the mover 136 overlap in the light emission direction. As illustrated in FIG. 11, in the present exemplary embodiment, for example, a straight line SL that passes a contact point between the contact member 132 and the substrate 42 and a contact point between the mover 136 and the shaft member 134 extends in the light emission direction of the light emitter 41.

The coefficient of friction between the contact member 132 and the substrate 42 is smaller than the coefficient of friction between the shaft member 134 and the contact member 132. More specifically, in the present exemplary embodiment, the contact member 132 is a ball bearing. Thus, the contact member 132 rotates relative to the shaft member 134 before friction occurs between the contact member 132 and the substrate 42.

The ends of the pair of support plates 140 in the Z direction are coupled together with a coupling plate 147. The coupling plate 147 has an opening 147A through which part of the outer periphery of the contact member 132 protrudes. The protruding part of the contact member 132 is in contact with the surface 42A of the substrate 42.

Figure 15:
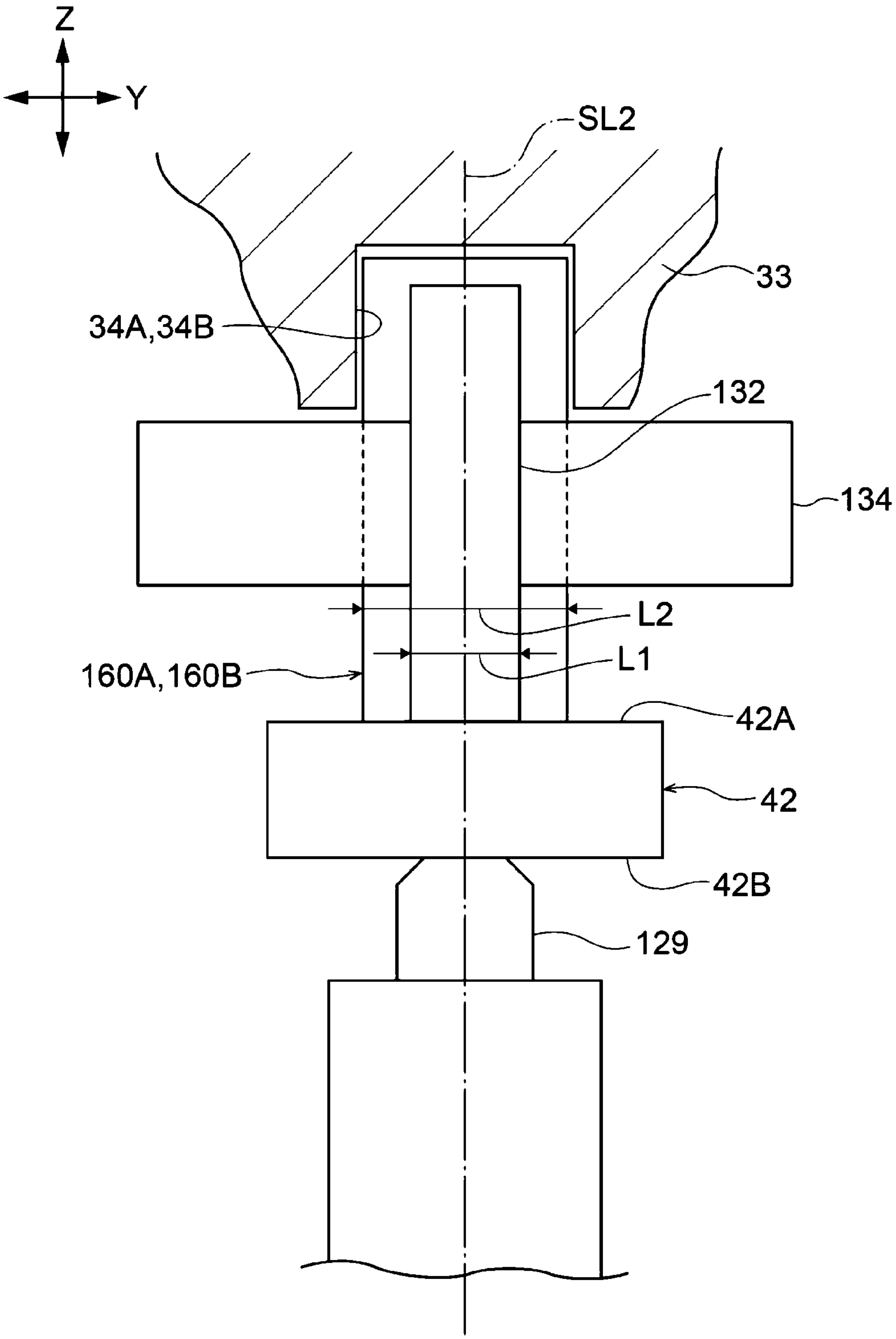
FIG. 15 is a diagram illustrating the relationship between the positioning portion, the adjuster, and a presser illustrated in FIG. 10 viewed in the apparatus depth direction.

As illustrated in FIG. 15, the position adjuster 130 is located to overlap the positioning portion 160 when viewed in the X direction. When coming into contact with the drum flange 33, the position adjuster 130 is fixed in position to overlap the positioning portion 160 when viewed in the X direction. More specifically, the mover 136 comes into contact with a block 36 disposed at the drum flange 33. In the present embodiment, the position adjuster 130 is located on the outer side, in the X direction, of the positioning portion 160 (refer to FIGS. 10 and 13).

The driving source 144 is disposed on the side of the position adjuster 130 in the X direction opposite to the side where the positioning portion 160 is disposed (disposed on the near side in the apparatus depth direction).

As illustrated in FIG. 15, a length L1, in the Y direction, of the outer peripheral surface 132A of the contact member 132 serving as a contact surface is shorter than a length L2 of the positioning portion 160 in the Y direction. In the present exemplary embodiment, the presser 129, the contact member 132, and the positioning portion 160 are disposed on a straight line (straight line SL2 in FIG. 15) extending in the light emission direction when viewed in the X direction. FIG. 15 illustrates a structure only relating to the substrate 42, the presser 129, the contact member 132, the shaft member 134, the positioning portion 160, and the restrictors 34.

Figure 18:
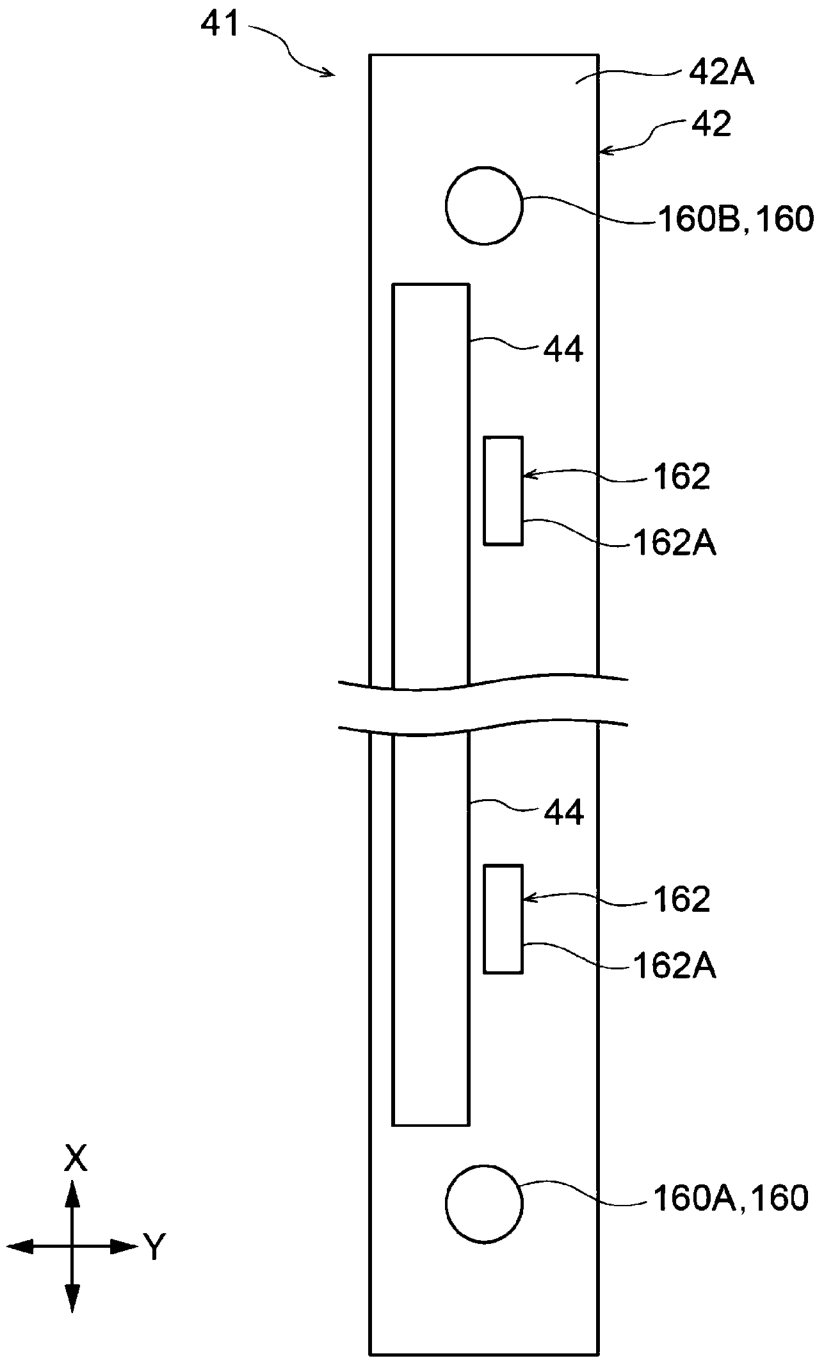
FIG. 18 is a plan view of a light emitter.

As illustrated in FIG. 18, the light emitter 41 according to the present exemplary embodiment includes measuring devices 162 adjacent to the light radiators 44 in the width direction of the substrate 42 (Y direction). The measuring devices 162 are devices that measure the distance from the light emitter 41 to the surface of the photoconductor drum 32. Each measuring device 162 is rectangular when viewed in the Z direction, and has long sides 162A extending in a direction in which the substrate 42 extends (X direction). The measuring devices 162 are disposed on the substrate 42 at portions where the contact members 132 of the position adjusters 130 come into contact.

In the image forming apparatus 10 according to the present exemplary embodiment, the distance from the light emitter 41 to the surface of the photoconductor drum 32 is measured by the measuring devices 162 disposed at both ends of the substrate 42, and the measurement information is transmitted to a controller not illustrated. The controller operates the position adjusters 130 based on the measurement information. More specifically, the controller adjusts the driving amount of the driving sources 144 based on the measurement information. When the values measured by the measuring devices 162 fall within a predetermined set range, the controller stops the operation of the driving sources 144. The position of the light emitter 41 may be adjusted by the position adjuster 130 at a timing when the light emitter 41 is attached to the photoconductor drum 32 or at a timing a predetermined time length (period) after the attachment.

Subsequently, the operations and effects of the present exemplary embodiment will be described.

In the image forming apparatus 10 including the exposure device 40 according to the present exemplary embodiment, each positioning portion 160 and the corresponding position adjuster 130 overlap each other when viewed in the X direction. Thus, compared to, for example, a structure where the positioning portion 160 and the position adjuster 130 are spaced apart from each other when viewed in the X direction, the image forming apparatus 10 has a smaller size in the direction perpendicular to the axial direction of the photoconductor drum 32.

In the image forming apparatus 10, the positioning portions 160 come into contact with the drum flanges 33 to fix the position in the Y direction, and each position adjuster 130 comes into contact with the block 36 disposed at the corresponding drum flange 33 to fix the position at a position that overlaps the positioning portion 160 when viewed in the X direction. Thus, compared to, for example, a structure where the reference by which the position is fixed differ between the positioning portion 160 and the position adjuster 130, the image forming apparatus 10 improves the accuracy of the position of the light emitter 41 with respect to the photoconductor drum 32.

In the image forming apparatus 10, each position adjuster 130 is located on the outer side of the corresponding positioning portion 160 in the X direction, that is, on the near side in the apparatus depth direction. Thus, compared to a structure, for example, where each position adjuster 130 is located on the inner side of the corresponding positioning portion 160 in the X direction (located closer to the middle portion of the photoconductor drum 32 in the axial direction), the image forming apparatus 10 facilitates fine adjustment of the distance between the light emitter 41 and the photoconductor drum 32.

In the image forming apparatus 10, each driving source 144 is disposed on the side of the corresponding position adjuster 130 in the X direction opposite to the side where the corresponding positioning portion 160 is disposed. Thus, compared to a structure, for example, where each driving source 144 is disposed on the side of the corresponding position adjuster 130 in the X direction where the corresponding positioning portion 160 is disposed, the image forming apparatus 10 enhances the accessibility to the driving source 144.

In the image forming apparatus 10, the length L1, in the Y direction, of the outer peripheral surface 132A of each contact member 132 serving as a contact surface is shorter than the length L2 of the corresponding positioning portion 160 in the Y direction. Thus, compared to a structure, for example, where the length L1 of each contact member 132 is longer than the length L2 of the corresponding positioning portion 160, the image forming apparatus 10 prevents misalignment of the focal point of the light emitter 41 resulting from inclination of the position adjuster 130.

In the image forming apparatus 10, each presser 129, the corresponding contact member 132, and the corresponding positioning portion 160 are disposed on the straight line SL2 extending in the light emission direction when viewed in the X direction. Thus, compared to a structure, for example, where each presser 129, the corresponding contact member 132, and the corresponding positioning portion 160 are disposed on different straight lines when viewed in the X direction, the size of the image forming unit 14 in the direction perpendicular to the X direction is reduced.

In the image forming apparatus 10, while being restricted by the first restrictor 34A, the first positioning portion 160A fixes its position in the Y direction, and while being restricted by the second restrictor 34B, the second positioning portion 160B fixes its position in the X direction and the Y direction. Thus, compared to a structure where, for example, movement of the first positioning portion 160A and the second positioning portion 160B in the X and Y directions is restricted, the image forming apparatus 10 reduces distortion of the substrate resulting from restriction.

In the image forming apparatus 10, the second positioning portion 160B is a protrusion, the second restrictor is a recess that receives the protrusion, and the portion of the recess that comes into contact with the protrusion in the X direction has an arc shape. Thus, compared to a structure, for example, where a portion of the recess that comes into contact with the protrusion in the X direction is angular, the image forming apparatus 10 reduces the galling of the protrusion caused when the protrusion is inclined.

In the image forming apparatus 10, the measuring devices 162 are disposed adjacent to the light-emitting devices in the width direction of the substrate and having the long sides extending in the direction in which the substrate 42 extends. Thus, unlike a structure, for example, where the long sides of each measuring device 162 extend in the width direction of the substrate 42, the measuring devices are symmetrically disposed with respect to the width direction (Y direction) of the substrate 42.

In the image forming apparatus 10, each measuring device 162 is disposed at a portion closer to the portion of the substrate 42 in the Y direction where the corresponding position adjuster 130 comes into contact than the end of the substrate 42 in the Y direction. Specifically, each measuring device 162 is disposed near the portion of the substrate 42 where the corresponding position adjuster 130 comes into contact. Thus, compared to a structure, for example, where each measuring device 162 is located at a position away from the portion of the substrate 42 where the contact member 132 of the corresponding position adjuster 130 comes into contact, the image forming apparatus 10 facilitates fine adjustment of the distance between the light emitter 41 and the photoconductor drum 32.

In the image forming apparatus according to any of the exemplary embodiments, three light emitters are disposed on the substrate, but the present disclosure is not limited to this structure. For example, one, two, four, or more light emitters may be disposed on the substrate. The positions of multiple light emitters disposed on the substrate may be set as appropriate.

In the image forming apparatus according to any of the exemplary embodiments, the substrate is formed from a metal block, but the present disclosure is not limited to this structure. The material or shape of the substrate may be changed. For example, the substrate may be formed from resin, or another metal material such as sheet metal. Components of the light emitter or the shape of each component of the light emitter may be changed. The support body of the light emitter is formed from a metal block, but the present disclosure is not limited to this structure. The material or shape of the support body may be changed. For example, the support body may be formed from resin, or another metal material such as sheet metal.

The image forming apparatus according to any of the exemplary embodiments is usable for any of the following purposes to which photolithography is applied: forming a color filter in a process of manufacturing a liquid crystal display (LCD), exposing a dry film resist (DFR) to light in a process of manufacturing a thin film transistor (TFT), exposing a dry film resist (DFR) to light in a process of manufacturing a plasma display panel (PDP), exposing a photosensitive member such as a photoresist in a process of manufacturing a semiconductor device, exposing a photosensitive member such as a photoresist in a process of plate-making in printing such as photogravure printing other than offset printing, and exposing a photosensitive member to light in a process of manufacturing components of a timepiece. Photolithography indicates a technology of exposing a surface of an object on which a photosensitive member is placed to light into a pattern to generate a pattern including a portion exposed to light and a portion not exposed to light.

The image forming apparatus may employ either a photon-mode photosensitive member to which information is directly recorded with light exposure, and a heat-mode photosensitive member to which information is recorded with heat generated by light exposure. A light emitting diode (LED) or a laser element is usable as a light source of the image forming apparatus in accordance with an object that is to be exposed to light.

Although the present disclosure has been described in detail using specific exemplary embodiments, the present disclosure is not limited to the exemplary embodiments. It is obvious to those skilled in the art that the present disclosure may be embodied in various exemplary embodiments within the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus, comprising:
an image carrier that extends in a first direction;
a light emitter that includes:
a substrate that extends in the first direction; and
a plurality of light-emitting devices that are disposed on the substrate and emit light to the image carrier, wherein the plurality of light-emitting devices are staggered when viewed in a direction perpendicular to the first direction;
a positioning portion that is disposed between the substrate and the image carrier, and that fixes a position of the light emitter with respect to the image carrier in at least one direction perpendicular to a light emission direction of the light emitter, wherein the positioning portion is a protrusion;
an adjuster that is located to overlap the positioning portion when viewed in the first direction, and that adjusts the position of the light emitter in the light emission direction, wherein the adjuster includes a driving source that moves the light emitter, and the adjuster includes a contact member that comes into contact with the substrate to move the substrate in the light emission direction; and
a support member attached to an apparatus body to rotatably support the image carrier, wherein the support member is a flange,
wherein the positioning portion protrudes from the substrate toward the support member and is fitted to a recess formed in the support member.

2. The image forming apparatus according to claim 1,
wherein when coming into contact with the support member, the positioning portion has a position fixed relative to the image carrier in the at least one direction perpendicular to the light emission direction, and
wherein when coming into contact with the support member, the adjuster has a position fixed to overlap the positioning portion when viewed in an axial direction of the image carrier parallel to the first direction.

3. The image forming apparatus according to claim 2,
wherein the adjuster is located on an outer side of the positioning portion in the axial direction of the image carrier.

4. The image forming apparatus according to claim 3,
wherein the driving source is disposed on a side of the adjuster in the axial direction of the image carrier opposite to a side where the positioning portion is disposed.

5. The image forming apparatus according to claim 4,
wherein a length of a contact surface of the contact member in the at least one direction perpendicular to the light emission direction is shorter than a length of the protrusion in the at least one direction perpendicular to the light emission direction.

6. The image forming apparatus according to claim 5, further comprising:
a pressing member that is disposed on a side of the substrate opposite to a side where the adjuster is disposed, and that presses the substrate toward the contact member, wherein the pressing member is a flange,
wherein the pressing member, the contact member, and the protrusion are disposed on a straight line extending in the light emission direction when viewed in the first direction.

7. The image forming apparatus according to claim 3,
wherein a length of a contact surface of the contact member in the at least one direction perpendicular to the light emission direction is shorter than a length of the protrusion in the at least one direction perpendicular to the light emission direction.

8. The image forming apparatus according to claim 7, further comprising:
a pressing member that is disposed on a side of the substrate opposite to a side where the adjuster is disposed, and that presses the substrate toward the contact member, wherein the pressing member is a flange,
wherein the pressing member, the contact member, and the protrusion are disposed on a straight line extending in the light emission direction when viewed in the first direction.

9. The image forming apparatus according to claim 3,
further comprising a measuring device that is disposed adjacent to the light-emitting device in a width direction of the substrate, and that measures a distance from the light emitter to an outer peripheral surface of the image carrier,
wherein the measuring device is rectangular when viewed in the light emission direction and has long sides extending in a direction in which the substrate extends.

10. The image forming apparatus according to claim 2,
wherein a length of a contact surface of the contact member in the at least one direction perpendicular to the light emission direction is shorter than a length of the protrusion in the at least one direction perpendicular to the light emission direction.

11. The image forming apparatus according to claim 10, further comprising:
a pressing member that is disposed on a side of the substrate opposite to a side where the adjuster is disposed, and that presses the substrate toward the contact member, wherein the pressing member is a flange,
wherein the pressing member, the contact member, and the protrusion are disposed on a straight line extending in the light emission direction when viewed in the first direction.

12. The image forming apparatus according to claim 2,
further comprising a measuring device that is disposed adjacent to the light-emitting device in a width direction of the substrate, and that measures a distance from the light emitter to an outer peripheral surface of the image carrier,
wherein the measuring device is rectangular when viewed in the light emission direction and has long sides extending in a direction in which the substrate extends.

13. The image forming apparatus according to claim 1,
wherein the adjuster is located on an outer side of the positioning portion in the axial direction of the image carrier.

14. The image forming apparatus according to claim 13, wherein the driving source is disposed on a side of the adjuster in the axial direction of the image carrier opposite to a side where the positioning portion is disposed.

15. The image forming apparatus according to claim 13, further comprising a measuring device that is disposed adjacent to the light-emitting device in a width direction of the substrate, and that measures a distance from the light emitter to an outer peripheral surface of the image carrier, wherein the measuring device is rectangular when viewed in the light emission direction and has long sides extending in a direction in which the substrate extends.

16. The image forming apparatus according to claim 1, further comprising a measuring device that is disposed adjacent to the light-emitting device in a width direction of the substrate, and that measures a distance from the light emitter to an outer peripheral surface of the image carrier, wherein the measuring device is rectangular when viewed in the light emission direction and has long sides extending in a direction in which the substrate extends.

17. The image forming apparatus according to claim 16, wherein the measuring device is disposed on the substrate at a portion closer to a portion where the adjuster comes into contact.

18. An image forming apparatus, comprising:

an image carrier that extends in a first direction;

a light emitter that includes:

a substrate that extends in the first direction; and a plurality of light-emitting devices that are disposed on the substrate and emit light to the image carrier;

a positioning portion that is disposed between the substrate and the image carrier, and that fixes a position of the light emitter with respect to the image carrier in at least one direction perpendicular to a light emission direction of the light emitter, wherein the positioning portion is a protrusion; and an adjuster that is located to overlap the positioning portion when viewed in the first direction, and that adjusts the position of the light emitter in the light emission direction, wherein the adjuster includes a driving source that moves the light emitter, wherein the positioning portion includes:

a first positioning portion disposed at a first end portion in a direction in which the substrate extends, wherein the first positioning portion is a protrusion; and a second positioning portion disposed at a second end portion in the direction in which the substrate extends, wherein the second positioning portion is a protrusion, wherein while being restricted by a first restrictor included in the image carrier, the first positioning portion has a position fixed in a width direction of the substrate, the width direction being included in the at least one direction perpendicular to the light emission direction, wherein the first restrictor is a recess, and wherein while being restricted by a second restrictor included in the image carrier, the second positioning portion has a position fixed in the width direction of the substrate and in the direction in which the substrate extends, the width direction and the direction in which the substrate extends being included in the at least one direction perpendicular to the light emission direction, wherein the second restrictor is a recess.

19. The image forming apparatus according to claim 18, wherein the second positioning portion is disposed on the substrate, wherein the second positioning portion is fitted to the second restrictor, and wherein a portion of the second restrictor that comes into contact with the second positioning portion in a direction in which the image carrier extends has an arc shape.

* * * * *